(12) United States Patent  
Wall et al.

(10) Patent No.: US 12,197,615 B2  
(45) Date of Patent: Jan. 14, 2025

(54) SECURED SEARCH FOR READY-MADE SEARCH SOFTWARE

(71) Applicant: IronCore Labs, Inc., Boulder, CO (US)

(72) Inventors: Robert Wall, Bozeman, MT (US); Patrick Walsh, Boulder, CO (US); Colt Frederickson, Bozeman, MT (US)

(73) Assignee: IronCore Labs, Inc., Boulder, CO (US)

( * ) Notice: Subject to any disclaimer, the term of this patent is extended or adjusted under 35 U.S.C. 154(b) by 337 days.

(21) Appl. No.: 17/813,430

(22) Filed: Jul. 19, 2022

(65) Prior Publication Data

US 2024/0028758 A1    Jan. 25, 2024

(51) Int. Cl.
  *G06F 21/62*    (2013.01)
  *G06F 21/31*    (2013.01)
  *G06F 21/60*    (2013.01)

(52) U.S. Cl.
  CPC .......... *G06F 21/6227* (2013.01); *G06F 21/31* (2013.01); *G06F 21/602* (2013.01)

(58) Field of Classification Search
  CPC ..... G06F 21/6227; G06F 21/31; G06F 21/602
  See application file for complete search history.

(56) References Cited

U.S. PATENT DOCUMENTS 8,515,058 B1    8/2013   Gentry
8,601,598 B2   12/2013   Ozzie et al.
(Continued)

FOREIGN PATENT DOCUMENTS

CN    102024054 A    4/2011
CN    108304733 A    7/2018
(Continued)

OTHER PUBLICATIONS

"Why SaaS Businesses Are Turning to Customer Managed Keys," Jul. 28, 2020, IronCore Labs, Boulder, Colorado, U.S. YouTube Video, transcribed from the Internet from https://www.youtube.com/watch?v=20CwtuhUS9Y on Jul. 19, 2022.
(Continued)

*Primary Examiner* — Vance M Little
(74) *Attorney, Agent, or Firm* — Stone Creek Services LLC; Alan M Flum

(57) ABSTRACT

Search management systems and methods that cryptographically-secure search indices, search queries, and associated document records while in-use by cloud-based search software without requiring modification to the cloud-based search core software. The search proxy resides between a cloud-based vendor application and the cloud-based search software. The search proxy uses key-based deterministic cryptographic tokenization to irreversibly cryptographically-secure plaintext words from document records for indexing and plaintext keywords from search queries for search and retrieval. The search proxy separately uses key-based encryption on the document record's pre-tokenized plaintext words, adding the encrypted data as a separate field to the document record. This encrypted field is stored as part of the document by the search service. A search query retrieves the encrypted field and the other parts of the
(Continued)

document record from the search software, and the search proxy decrypts the field to reproduce the original document record.

30 Claims, 27 Drawing Sheets

(56) References Cited

U.S. PATENT DOCUMENTS

| | | | |
|---|---|---|---|
| 8,630,422 | B2 | 1/2014 | Gentry |
| 8,806,223 | B2 | 8/2014 | Crowe |
| 9,015,493 | B2 | 4/2015 | Hu et al. |
| 9,087,212 | B2 | 7/2015 | Balakrishnan et al. |
| 9,111,106 | B2 | 8/2015 | Matsuda et al. |
| 9,137,222 | B2 | 9/2015 | Haeger et al. |
| 9,256,764 | B2 | 2/2016 | Aissi et al. |
| 9,292,673 | B2 | 3/2016 | Rutkowski et al. |
| 9,342,705 | B1 | 5/2016 | Schneider et al. |
| 9,350,536 | B2 | 5/2016 | Sabin |
| 9,379,890 | B1 | 6/2016 | Blakely et al. |
| 9,391,965 | B2 | 7/2016 | Hattori et al. |
| 9,418,238 | B2 | 8/2016 | Ito et al. |
| 9,454,673 | B1* | 9/2016 | Sarukkai ............... H04L 9/0894 |
| 9,509,494 | B2 | 11/2016 | Nita |
| 9,552,492 | B2 | 1/2017 | Kohol et al. |
| 9,660,801 | B2 | 5/2017 | Parann-Nissany |
| 9,690,845 | B2 | 6/2017 | Araki et al. |
| 9,954,828 | B1 | 4/2018 | Chandrasekhar et al. |
| 9,973,488 | B1 | 5/2018 | Roth et al. |
| 10,037,435 | B2 | 7/2018 | Baessler et al. |
| 10,122,714 | B2 | 11/2018 | Kahol et al. |
| 10,235,539 | B2 | 3/2019 | Ito et al. |
| 10,341,410 | B2 | 7/2019 | Lander et al. |
| 10,402,581 | B2 | 9/2019 | Wang et al. |
| 10,404,669 | B2 | 9/2019 | Dawoud |
| 10,673,614 | B2 | 6/2020 | Hirano et al. |
| 10,796,782 | B2 | 10/2020 | Shelton |
| 10,872,158 | B2 | 12/2020 | Hayasaka et al. |
| 10,936,745 | B2 | 3/2021 | Jain et al. |
| 11,038,855 | B2 | 6/2021 | Frank |
| 2014/0075568 | A1* | 3/2014 | Sathyadevan ......... G06F 21/554 726/27 |
| 2014/0237234 | A1 | 8/2014 | O'Connor et al. |
| 2015/0356314 | A1 | 12/2015 | Kumar et al. |
| 2017/0262546 | A1 | 9/2017 | Chen et al. |
| 2020/0250325 | A1 | 8/2020 | Chong et al. |
| 2020/0266972 | A1 | 8/2020 | Chakraborty et al. |
| 2021/0081562 | A1 | 3/2021 | Hirano et al. |
| 2022/0414152 | A1* | 12/2022 | Alonichau ............ G06F 16/906 |

FOREIGN PATENT DOCUMENTS

| | | |
|---|---|---|
| CN | 109495254 A | 3/2019 |
| JP | 2002297650 A | 10/2002 |
| JP | 2005134990 A | 5/2005 |
| JP | 2009211384 A | 9/2009 |
| JP | 2012079192 A | 4/2012 |
| JP | 2016200938 A | 12/2016 |
| WO | 2018080857 A1 | 5/2018 |

OTHER PUBLICATIONS

"SaaS Shield CMK for Amazon S3—Demo," Nov. 16, 2020, IronCore Labs, Boulder, Colorado, U.S., YouTube video, transcripted from the Internet from https://www.youtube.com/watch?v=VBwLSh6awhM on Dec. 7, 2021.

Saas Shield, Internet Archive, Sep. 2020, IronCore Labs, Boulder, Colorado, U.S., downloaded from the Internet: https://web.archive.org/web/20200922130855/https://ironcorelabs.com/products/saas-shield/ on Jul. 19, 2022.

Tokenization vs Encryption, McAfee, San Jose, California, Downloaded from the Internet from https://www.mcafee.com/enterprise/en-us/security-awareness/cloud/tokenization-vs-encryption.html on Dec. 8, 2021.

Craig Gentry, A Fully Homomorphic Encryption Scheme, Sep. 2009, Stanford University, Stanford, California.

Dhruti Sharma, Devesh C. Jinwala, Multiuser Searchable Encryption with Token Freshness Verification, Hindawi Security and Communication Networks, Nov. 2017, vol. 2017, Hindawi Limited, London, United Kingdom.

M.K. Kurhdkar, V.M. Deshmukh, Review of Key-aggregate Searchable Encryption Technique for Group Data Shearing Literature, International Journal of Scientific & Engineering Research, Feb. 2016, vol. 7, No. 2.

Iftekhar Salam, Wei-Chuen Yau, Ji-Jian Chin, Swee-Huay Heng, Huo-Chong Ling, Raphael C-W Phan, Geong Sen Poh, Syh-Yuantan, Wun-She Yap, Implementation of searchable symmetric encryption for privacy-preserving keyword search on cloud storage, Human-centric Computing and Information Sciences, Jul. 2015, vol. 5, No. 19, pp. 1-16, Springer Nature Switzerland AG.

Khadijah Chamili, Jan Nordin, Waidah Ismail, Abduljalil Radman, International Journal of Security and its Applications, Dec. 2017, vol. 11, No. 12, pp. 79-88.

R. Prabhu, S. Rajesh, Symmetric Searchable Encryption and Data Retrieval in Cloud Computing, International Journal of Research in Electronics and Computer Engineering, Jul. 2018, vol. 6, No. 3, pp. 1908-1913, International Institute of Organized Research (I2OR), Chandigarh, India.

Alice Kupcik, Transparent data encryption or always encrypted? downloaded from the Internet from https://azure.microsoft.com/en-us/blog/transparent-data-encryption-or-always-encrypted/ on Aug. 26, 2021.

Always Encrypted, Oct. 2019, downloaded from the Internet from https://docs.microsoft.com/en-us/sql/relational-databases/security/encryption/always-encrypted-database-engine?view=sql-server-2017 on Aug. 26, 2021.

Raluca Ada Popa, Catherine M. S. Redfield, Nickolai Zeldovich, and Hari Balakrishnan, CryptDB: Protecting Confidentiality with Encrypted Query Processing, SOSP '11, Oct. 23-26, 2011, Cascais, Portugal.

Velraj Kalaiselvan, Lai Wei, Jacob Wootan, Data Proxy for Evaluation of Encryption in Cloud Computing, 605.731 Class Research Symposium 2021, Aug. 2021, Johns Hopkins University, Baltimore, Maryland.

* cited by examiner

| NAME FIELD | | | 178 |
|---|---|---|---|
| ID | Term | Document | Tenant ID |
| 1 | james | 1,2 | 23,85 | ←179
| 2 | smith | 1,2 | 23,85 | ←180

| ADDRESS FIELD | | | 181 |
|---|---|---|---|
| ID | Term | Document | Tenant ID |
| 3 | 5bee7f89 | 1 | 23 | ←182
| 4 | 66e5bcc7 | 1 | 23 | ←183
| 5 | ea9363b0 | 1 | 23 | ←184
| 6 | 2060b576 | 1 | 23 | ←185
| 7 | 9c64f301 | 1 | 23 | ←186
| 8 | 60d0ca1d | 1 | 23 | ←187
| 9 | 5ab54196 | 2 | 85 | ←188
| 10 | 50db66ef | 2 | 85 | ←189
| 11 | 541de951 | 2 | 85 | ←190
| 12 | 8bb464b2 | 2 | 85 | ←191
| 13 | 820baa4e | 2 | 85 | ←192
| 14 | 32ca17b5 | 2 | 85 | ←193

*FIG. 12*

SECURED SEARCH FOR READY-MADE SEARCH SOFTWARE

FIELD OF INVENTION

The present disclosure relates to cryptographically secured searching.

BACKGROUND

Many business applications require searching of data and records. Examples of such business applications include email, contact relationship management, payroll, human resource management, enterprise resource planning, and electronic document storage and retrieval.

Data is often organized using a relational database management system (RDMS) and may use Structured Query Language (SQL) for searching the contents of the database. RDMS often depends on SQL to perform simple searches, such as searching for relations where an attribute contains a single keyword or an exact phrase. An example of this could be a search for a specific first or last name in a set of customer records. More complex searches typically require specialized search software. The specialized search software can be built into the business application or can be stand-alone search software. Stand-alone search software can be installed on a company's own servers or offered as a cloud-based service. The stand-alone search software can be ready-made or off-the-shelf, as opposed to software that is custom-made or whose code or core features are customized or modified. For the purpose of this disclosure, specialized search software that is off-the-shelf or ready-made will be referred to as "ready-made search software." Examples of ready-made search software include Elasticsearch, OpenSearch, Azure Search, Solr, Algolia, Searchify, and IBM Watson Discovery.

For efficiency, rather than searching an entire collection of documents or data records each time a user executes a search, search software typically creates an index of the documents or data records. The index contains a list of words generated from words or phrases within the documents, with each word pointing to the documents that contain that word. This is analogous to the index of the back of a book, except rather than referencing page numbers, like in a book, the search software may provide in response to a search, a list of document IDs, hyperlinks, or the document contents.

Typically, a web-based vendor application sits between the user and the search software. The user logs into the vendor application, but not the search software directly. That vendor application accesses the search software, is responsible for managing and filtering results, and makes sure that only authorized users have access to the data. The data is typically encrypted at a disk level and temporarily decrypted when used or processed by the search software. For example, the data is decrypted during indexing, searching, or retrieval. While the data is not in-use, the data remains encrypted on the storage medium, typically on hard drives or solid-state drives (SSD). Encryption of data while not in-use and decrypting while being used is known as "encryption at rest." Encryption at rest is also used to protect personal computers and mobile devices. While the user is logged in, the data is available to the user in plaintext. If the device was not in-use, but was stolen, the thief would not be able to gain access to the information on the device because it is encrypted. Similarly, if a drive at a data center is physically stolen or discarded with the data intact, it would be difficult for the data on the stolen or discarded drive to be compromised. Several specific implementations of encryption at rest are collectively known as "transparent data encryption."

SUMMARY

The inventors set out to create a search management system that allows secure searching using ready-made search software without customizing the software (i.e., off-the-shelf with configuration). Search software works on the principle of indexing data, processing user queries, and responding to the user queries. Ready-made search software typically runs on data that is unencrypted or encrypted at rest. Indexing, processing user queries, and responding to the user queries are all performed on plaintext data. The inventors noted that one of the challenges with transparent layer encryption, or with encryption at rest, is that anyone with administrative privileges to the server that stores the search indices and data potentially has access to the data in unencrypted form. If hackers were to break into the system and gain administrative privileges, they could gain access to the unencrypted data that the servers can present.

Another challenge recognized by the inventors is to keep search data, queries, and associated stored documents secure in a multi-tenant environment. A multi-tenant environment is one in which more than one company shares one installation of a particular software application and shares associated data storage. In this case, many companies, including small and multi-national corporations might share one installation of ready-made search software and the associated search index and data storage. In this particular example, each company is referred to as a tenant. More generally, a tenant can be a logical grouping of data that is cryptographically isolated from other logical groupings of data. For example, tenants could be different departments within a company that are cryptographically isolated from each other.

The inventors resolved the above challenges by using an approach similar to the concept called application-layer encryption where the data is encrypted in-use as well as at rest. However, instead of merely encrypting data in-use, the inventors' approach uses a combination of processes applied to the same plaintext data. These processes are executed on a search proxy that resides between the vendor application and the ready-made search software. First, the search proxy cryptographically tokenizes each individual plaintext word within specific fields of a document. This process is irreversible. Second, the same fields, containing the same original plaintext words, are aggregated together and encrypted using key-based reversible encryption. The resulting encrypted document field is appended to the cryptographically-tokenized words. An example of a key-based reversible encryption process is Advanced Encryption Standard (AES).

The ready-made search software can index the cryptographically-tokenized words in the same way that plaintext words are indexed. However, because the words are irreversibly cryptographically tokenized, the original text from the document is not retrievable. The encrypted version of the same document fields can be stored and retrieved by the ready-made search software but cannot be indexed. It remains strongly encrypted while being used by the ready-made search software, because the ready-made search software does not have access to the encryption key that can decrypt it. The search proxy has access to this encryption key.

The cryptographic tokenization process is made irreversible, typically by using a keyed cryptographic hash function. A hash function maps data of arbitrary length to a fixed length. For example, secured hash algorithm 256-bits (SHA-256) is a type of cryptographic hash routine that maps an arbitrary amount of data into a single 256-bit summary value. A keyed cryptographic hash function uses a "key" as another input to the hash function. A key is a value used by a cryptographic algorithm to create a unique output for the same string of input data if a different key is provided. A keyed cryptographic hash function is deterministic in the sense that the same search key and input data will always produce the same output. Cryptographically-secure hashes are irreversible; that is, even if an attacker knows the key, the input data cannot be recovered from the output hash by any means other than trying every possible string of input data until one is found that produces the expected hash. The inventors found this principle useful for creating cryptographically obscured words for secure use in a search index and for creating secure search queries. For example, a plaintext word "Smith" is cryptographically tokenized using a search key and stored in the search index. Later the same customer uses that same word, "Smith" in a search query. Because the search proxy uses the same search key to cryptographically tokenize the search query, the word "Smith" will result in the same cryptographic token, and the ready-made search software will match the cryptographic tokens.

In a multi-tenant system, the search keys and encryption keys are tenant-specific. This prevents one tenant from gaining access to another tenant's sensitive data. For added security, rather than using one tenant-specific search key to cryptographically tokenize all the protected fields, two or more search keys can be used for a corresponding two or more protected fields. In other words, each protected field can use a field-specific/tenant-specific search key. For example, in a payroll system for a given tenant, the name, social security, and salary fields could all use separate search keys.

Once the ready-made search software receives a search query and finds matches in its index, it will return the matching documents from its search to the search proxy. The query might have requested a subset of the document fields to return; if any of those fields is a protected field, each document returned by the search software will include cryptographically-tokenized words arranged in their appropriate fields. The search proxy adds the encrypted fields to the list of requested fields in the query if there are any protected fields included, so each document in the response will include the associated encrypted document field. For each protected field to be returned, the search proxy will decrypt the encrypted document field using the same encryption key used to encrypt it. In a multi-tenant system, this will be a tenant-specific encryption key. The search proxy will remove or discard the cryptographically-tokenized words returned by the search software and replace them with the plaintext words from the decrypted document field. It will also remove or discard the encrypted document field. The resulting plaintext search results are returned to the user through the vendor application.

The search management system can be capable of wildcard searching; for example, if one wanted to search for Jamie or James, they could enter the search wildcard term, "Jam*." To accomplish this, the search proxy can break up words to be cryptographically tokenized into fixed word portions or n-grams. These fixed word portions will be overlapping. For example, the name "James Smith" will be broken down into a sequence of three-character overlapping strings (i.e., an overlapping trigram) as follows: "jam," "ame," "mes," "smi," "mit," "ith." Each of these trigrams would be individually cryptographically tokenized. The ready-made search software would see each of these cryptographic tokens as a separate word and index them accordingly.

The search management systems and methods have the following advantages. (1) The existence and workings of the search proxy are invisible to the end user. The end user logs into the vendor application, uploads documents or enters document records, sends plaintext queries, and retrieves plaintext results as they normally would. (2) Because the search management system runs from the search proxy, the search management system can be implemented using ready-made search software without modification or customization of its underlying code or operation. Likewise, vendor applications that are already using the ready-made search software should require no modifications or customizations to take advantage of the increased security provided by the search proxy. (3) A hacker gaining access to the ready-made search software's index or document files would not have access to sensitive data. The sensitive index terms are cryptographically tokenized, and the document fields containing the original text are encrypted. (4) The search management system is resistant to injection attacks in the search query and resistant to attacks that take advantage of misconfiguration of the ready-made search software. Even if the data were somehow exposed, sensitive keywords in the search indices would be tokenized and the associated original text would be encrypted. With the keys being held and managed remotely by the search management system and held by the client's key management system, the attacker would not have access to the unencrypted data. (5) The search management system allows tenants in a multi-tenant environment to hold their own keys using their own key management system without sharing private keys with their service provider. This can be referred to as "bring your own keys," or "customer managed keys." (6) The search management system can be configured to allow for complex search strings, for example, prefix matching, suffix matching, field prioritization, phonetic/fuzzy matches, and Boolean logic.

This Summary introduces a selection of concepts in simplified form that are described in the Description. This Summary is not intended to identify essential features or limit the scope of the claims.

BRIEF DESCRIPTION OF THE DRAWINGS

FIG. 12 illustrates a conceptual representation of a search index that includes cryptographically-tokenized fields of the document records of FIGS. 10 and 11.

DESCRIPTION

The following terms are used throughout this disclosure and are defined here for clarity and convenience.

Ready-Made Search Software: As defined in this disclosure, ready-made search software refers to search software that is ready-made or off-the-shelf, as opposed to software that is custom-made or whose code or core features are customized or require modification. Examples of ready-made search software include Elasticsearch, OpenSearch, Azure Search, Solr, Algolia, Searchify, and IBM Watson Discovery.

Client device: Throughout this disclosure, unless otherwise indicated, the term "client device" can include desktop computers, notebook computers, mobile devices, tablet computing devices, or other devices operated by a client or end user, that are capable of communicating over the Internet and capable of querying and receiving document records.

As discussed in the Summary, the inventors set out to create a search management system that allows secure searching using a ready-made search software, such as Elasticsearch, OpenSearch, Azure Search, or Solr, without modification to the core software. The inventors noted that one of the challenges with encryption at rest is that it does not protect data while it is being used. For search software, this data includes words stored in the search indices as well as documents associated with those words. Anyone who gains administrative privileges to the server that stores the data potentially has access to it in unencrypted form. If hackers were to break into a system storing the data and gain administrative privileges, they gain access to the unencrypted data (i.e., plaintext data).

Figure 1:
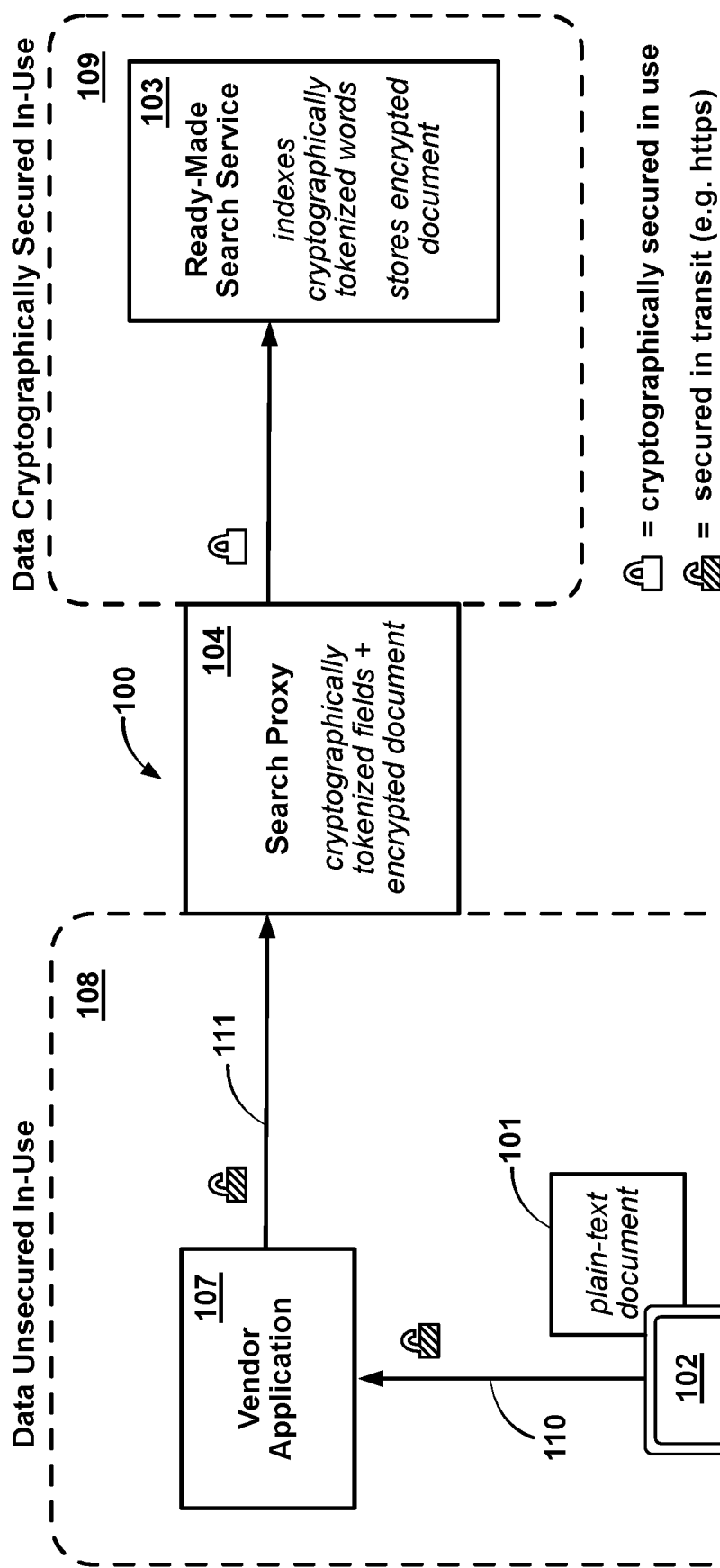
FIG. 1 illustrates a simplified overview of an example of a search management system with a search proxy positioned between data unsecured while in-use and data that is secured while in-use.
Figure 2:
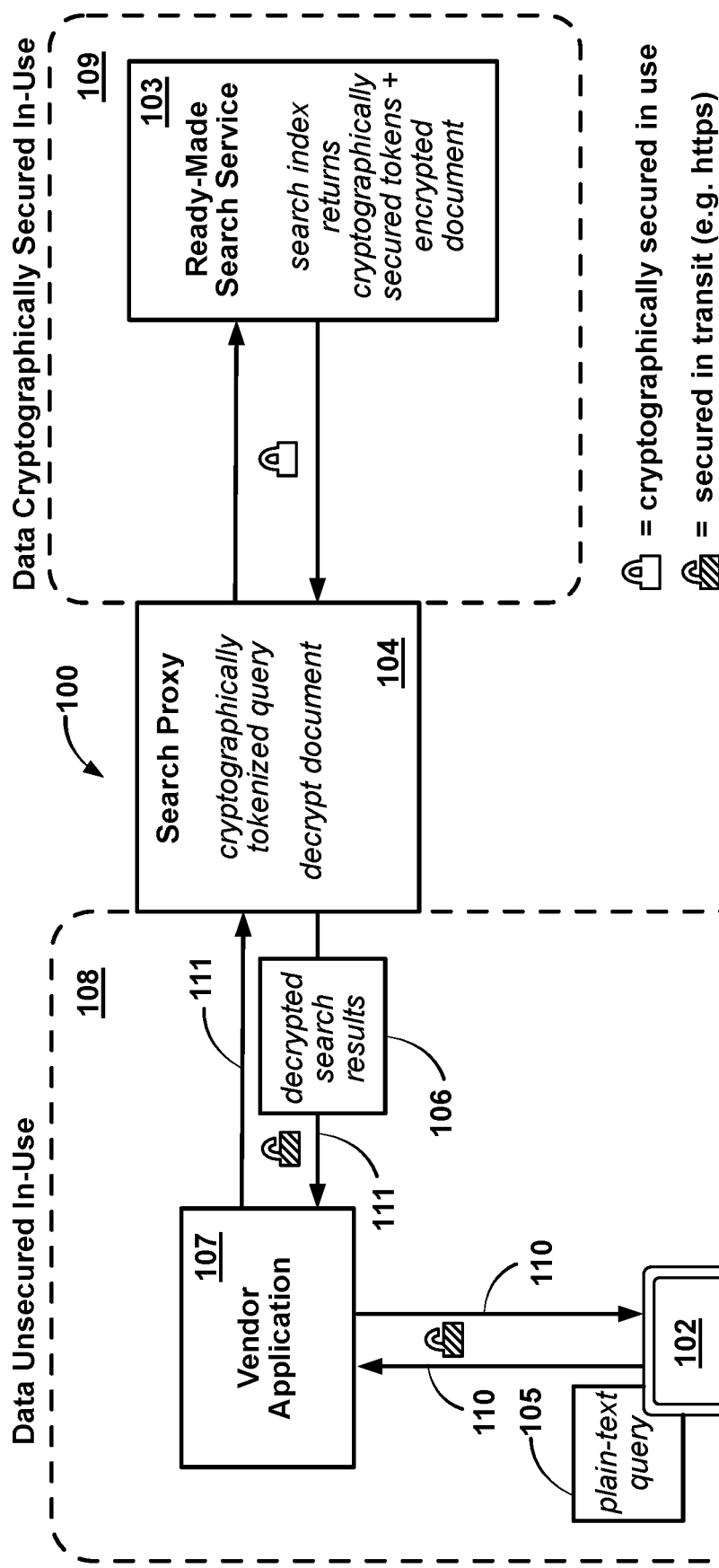
FIG. 2 illustrates the search management system of FIG. 1 showing the system performing a query and retrieving the results.

FIGS. 1 and 2 illustrate a simplified example of a search management system 100 that solves the above problem. In FIG. 1, a document 101 sent by a client device 102 for storage off site and indexing by ready-made search software 103, is cryptographically secured by a search proxy 104. In FIG. 2, the client device 102 initiates a search query 105 and the search proxy 104 cryptographically secures the search query 105. The search proxy 104 processes the results and returns the decrypted search results 106. Referring to FIGS. 1 and 2, the search proxy 104 can accomplish the above by cryptographically securing document fields within the document 101 (FIG. 1), cryptographically securing the search query, and decrypting and presenting search results. Referring to FIG. 1, the search proxy 104 can secure the document fields within the document 101 by two processes: (1) cryptographically tokenizing plaintext words within the document fields, and (2) aggregating the same document fields and encrypting them. The cryptographic tokenization in process one is irreversible. The encryption in process two is reversible.

Referring to FIG. 2, the search proxy 104 can cryptographically secure search queries by cryptographically tokenizing keywords within the search query using the same search key or keys as used to tokenize the cryptographically-secure document fields. In response to the search query, the search proxy 104 receives the encrypted document field and cryptographically-tokenized results from the ready-made search software 103. The search proxy 104 creates decrypted search results 106 by decrypting the encrypted document field and replacing cryptographically-tokenized document fields with the corresponding plaintext fields from the decrypted field. The above-described can be accomplished without modification to the ready-made search software 103 because the search proxy 104 performs the cryptographic tokenization, document encryption, and document decryption. From the point of view of the ready-made search software 103 it is simply receiving document and queries and returning results.

Referring to FIG. 1, the search proxy 104 replaces plaintext words within certain document fields with cryptographically-tokenized versions of those words, creating a modified document record. These document fields are typically pre-configured or marked as containing sensitive or "protected" data. For example, a social security number field or mother's maiden name field would typically be considered a sensitive field or a "protected field." The cryptographically-tokenized words from the modified document record are indexed by the ready-made search software 103 just as plaintext keywords would be indexed. The cryptographic tokenization process is irreversible, typically implemented using a deterministic hash function and not storing a hash table to decipher the cryptographically-tokenized words. The hash function should also accept a search key as a second input.

A hash function maps data of arbitrary length to a fixed length. For example, SHA-256 is a type of cryptographic hash routine that maps an arbitrary amount of data into a single 256-bit summary value. A keyed cryptographic hash function uses a "key" as a second input to the hash function. A key is a value used by a cryptographic algorithm to create a unique output for the same string of input data if a different key is provided. An example of a complete cryptographic hash function is HMAC (hash message authentication code) with SHA-256. A keyed cryptographic hash function is deterministic in the sense that the same search key and input data will always produce the same output. Cryptographically-secure hashes are irreversible; that is, even if an attacker knows the key, the input data cannot be recovered from the output hash by any means other than trying every possible string of input data until one is found that produces the expected hash. The inventors found this principle useful for creating cryptographic words for secure use in a search index and for creating secure search queries. For example, a plaintext word "Smith" is cryptographically tokenized using a search key and stored in the search index. Later the same customer uses that same word, "Smith" in a search query. Because the search proxy uses the same search key to cryptographically tokenize the words in the search query, the word "Smith" will result in the same cryptographic token, and the ready-made search software 103 will match the cryptographically-tokenized strings.

Because the cryptographic tokens stored in the search index are irreversibly tokenized, they cannot be used to create the decrypted search results 106 in FIG. 2. Referring to FIG. 1, for this reason, the search proxy 104 also aggregates the same plaintext document fields containing the same original plaintext words and then reversibly encrypts them using an encryption key. The resulting encrypted document field is appended to the modified document record along with the cryptographically-tokenized fields. The resulting secured document is sent to the ready-made search software 103, where the cryptographic tokens are indexed, as previously described, and the document, including the encrypted document field, is stored.

Referring to FIG. 2, the search proxy 104 transforms the keywords within the search query 105 into cryptographically-tokenized keywords (i.e., cryptographic tokens) using the same search key that created the cryptographically-tokenized words stored in the search index of the ready-made search software 103. The ready-made search software 103 attempts to match the cryptographically-tokenized search terms within the search query with the cryptographically-tokenized words stored in the search index.

As a result of matching the search query, the ready-made search software 103 returns documents that might contain one ore more cryptographically-tokenized fields and the associated encrypted document field. The search proxy 104 produces the decrypted search results 106 by decrypting the encrypted document field and replacing the cryptographic tokenized fields with the plaintext from the decrypted field. The decrypted search results 106 are returned to the client device 102 via the vendor application 107.

Referring to FIGS. 1 and 2, the search proxy 104 is positioned between a vendor application 107 and the ready-made search software 103. The dashed-line box to the left of the search proxy 104 conceptually represents data unsecured-in-use 108 while the dashed-line box to the right of search proxy 104 represents data cryptographically secured-in-use 109. The client device 102 typically communicates to a vendor application 107. The vendor application 107 is typically cloud-hosted on the internet. The vendor application 107 can provide a login for user authentication and provide productivity tools. Examples of vendor-application-provided productivity tools include team collaboration, messaging, contact management, e-commerce platforms, and digital content creation collaboration. Examples of vendor applications include Google Workspace, Slack, Shopify, Salesforce, Hubspot, and Rally. The communication channel 110 between the client device 102 and the vendor application 107, as well as the communication channel 111 between the vendor application 107 and the search proxy 104 can be secured in transit. For example, public key encryption via hypertext transfer protocol secure (HTTPS) can be used to secure communication channel 110 or communication channel 111.

Another challenge recognized by the inventors is to keep search data, queries, and associated stored documents secure in a multi-tenant environment. A multi-tenant environment is one in which more than one company shares one installation of a particular software application and shares associated data storage. In this case, many companies, including small and multi-national corporations, might share one installation of ready-made search software and the associated search index and data storage. Each company is referred to as a tenant.

Figure 3:
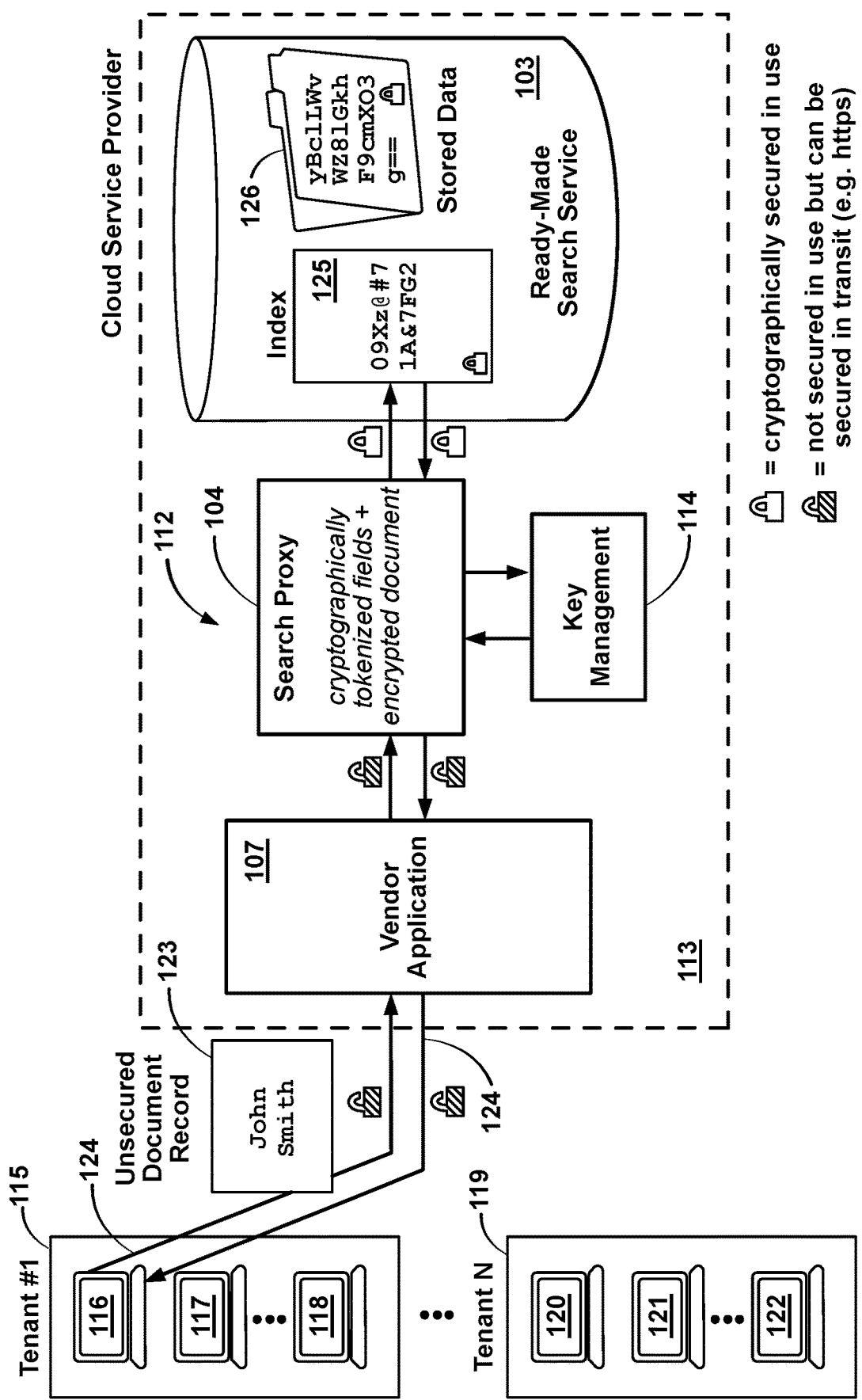
FIG. 3 illustrates an overview example of a search management system that can be used in a multi-tenant environment where the search proxy and vendor application are hosted by the cloud service provider and illustrating the search proxy cryptographically securing an unsecured document, or document record, by data encryption and cryptographic tokenization.
Figure 4:
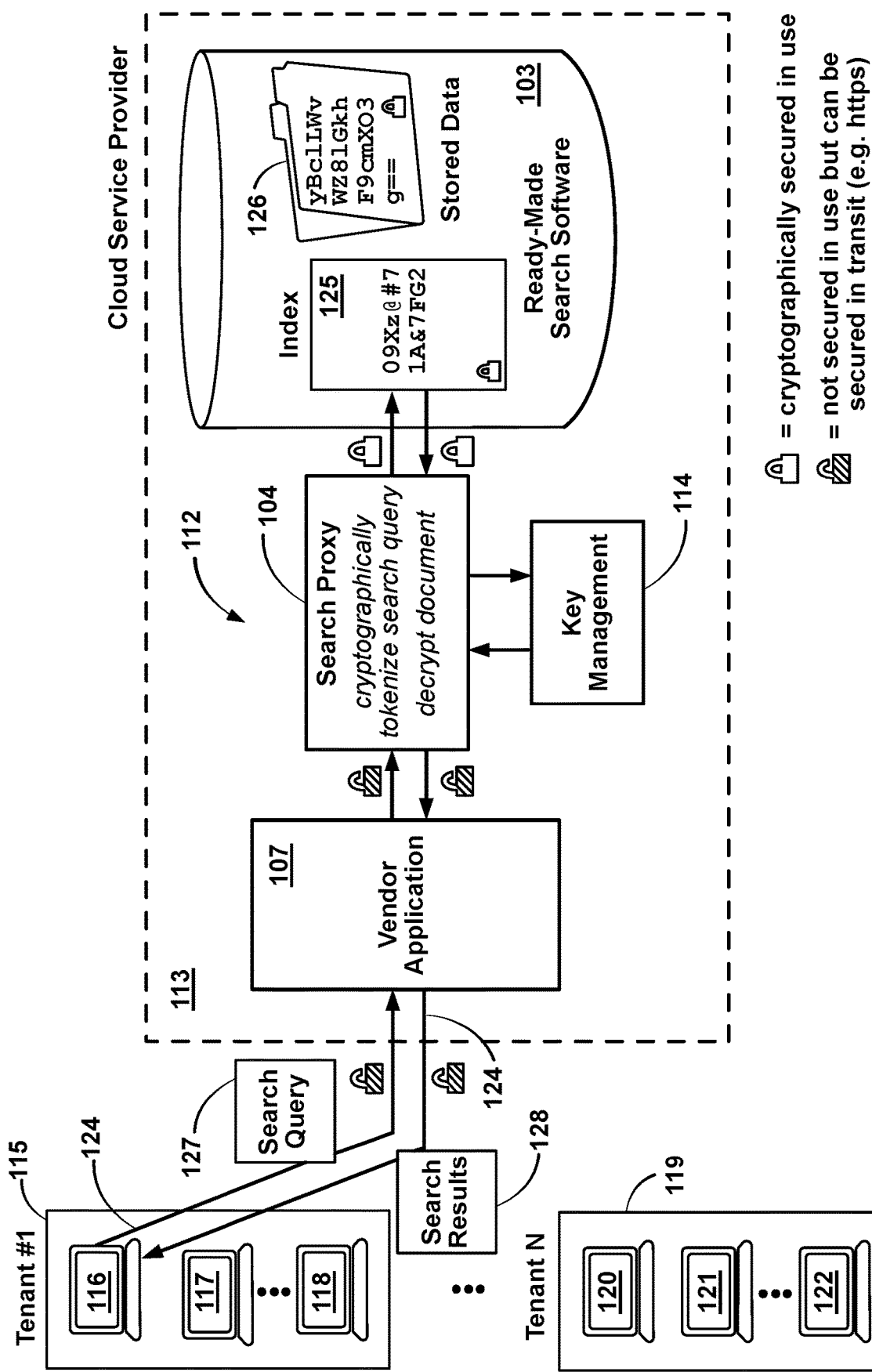
FIG. 4 illustrates sending a search query and receiving results with the search management system topology of FIG. 3.
Figure 7:
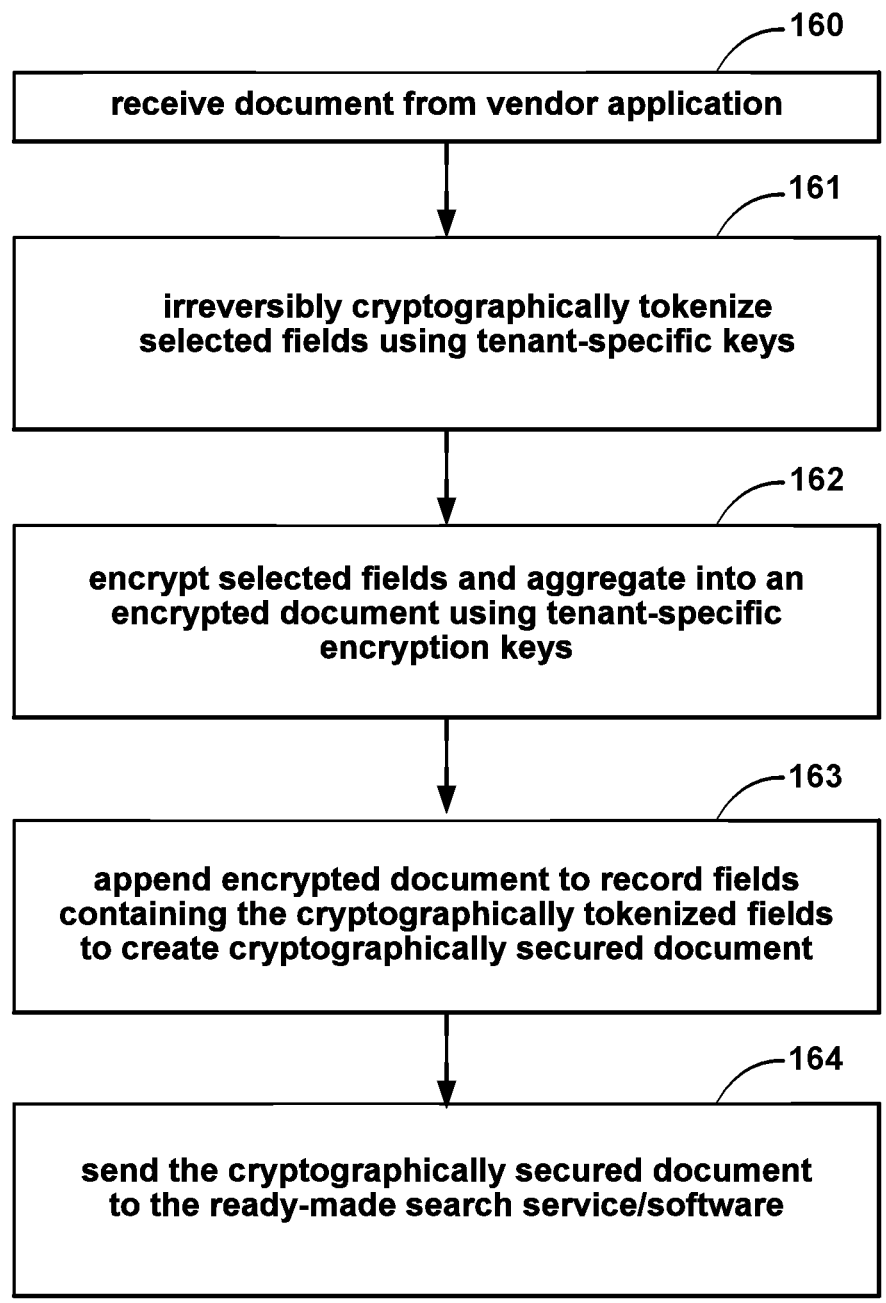
FIG. 7 illustrates a flow chart showing the process of protecting data in-use by irreversibly cryptographically tokenizing words within the protected fields and separating encrypting the protected fields.
Figure 8:
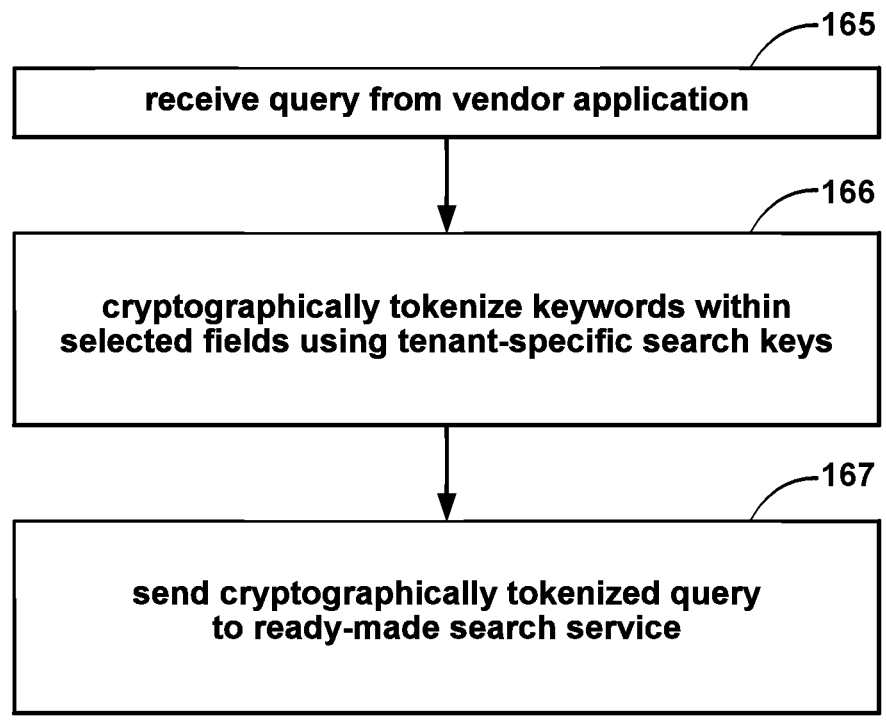
FIG. 8 illustrates a typical flow chart for irreversibly cryptographically tokenizing a search query.
Figure 9:
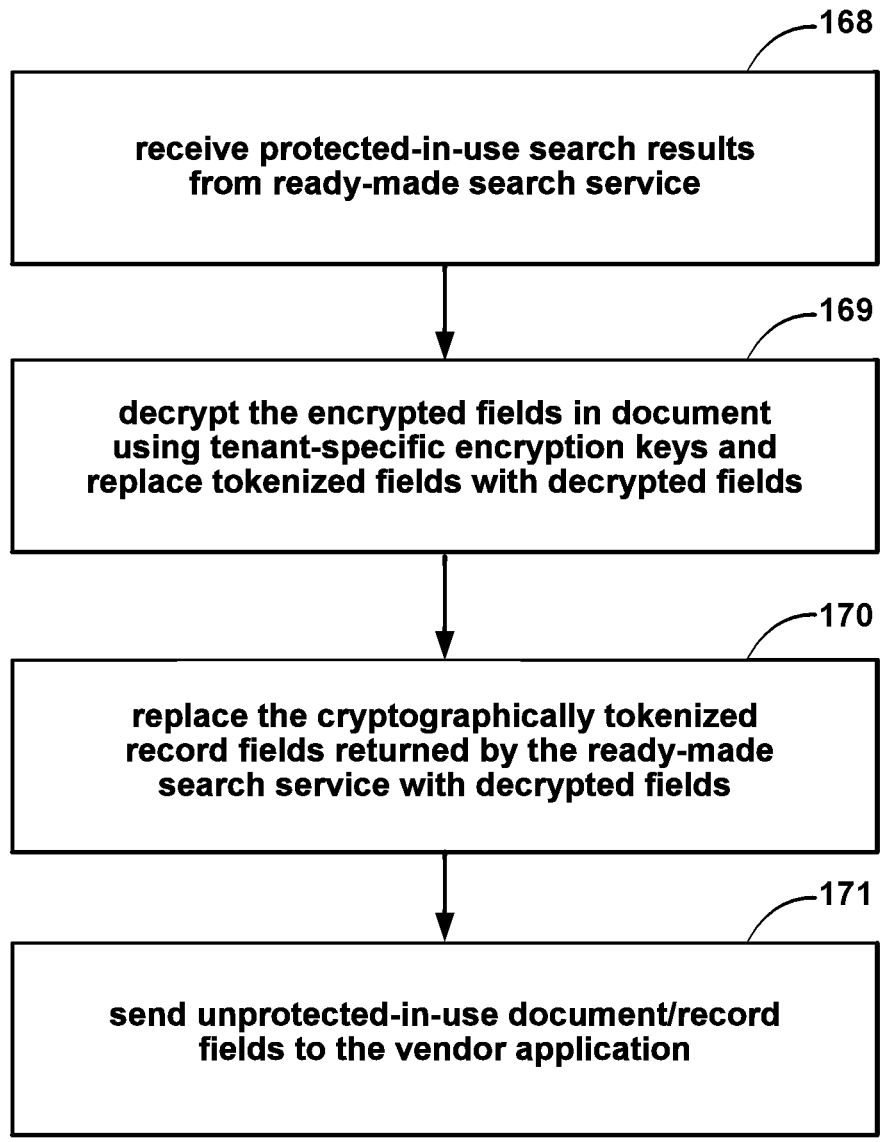
FIG. 9 illustrates a typical flow chart for retrieving and decrypting the results of the search query from the ready-made search software.

FIGS. 3 and 4 illustrate an example of a search management system 112 that can be used in a multi-tenant environment, on behalf of two or more tenants. FIGS. 7-9 summarize the process performed by the search proxy 104 of FIGS. 3 and 4 for creating a cryptographically-secure document (FIG. 7), cryptographically securing a search query (FIG. 8), and decrypting and preparing the search results (FIG. 9).

Referring to FIGS. 3 and 4, the cloud service provider 113 hosts search proxy 104, vendor application 107, and ready-made search software 103. The search proxy 104 is positioned between the ready-made search software 103 and the vendor application 107. The search management system 112 as illustrated includes search proxy 104 and key management system 114.

Referring to FIGS. 3 and 7, where called-out elements refer to FIG. 3 and called-out steps refer to FIG. 7, in step 160, the vendor application 107 authenticates computing devices belonging to or under the control of tenants authorized to access the services of the cloud service provider 113. Referring to FIGS. 3 and 4, in this example, tenant 115 is illustrated with client device 116, 117, 118 capable of communicating with vendor application 107. Tenant 119 is illustrated with client device 120, 121, 122 capable of communicating with vendor application 107.

Referring to FIG. 3, as an example, client device 116 sends a document record 123 for indexing and storage at the cloud service provider 113. The communication channel 124 between client device 116 and the vendor application 107 can be secured in transit using HTTPS. Referring to FIGS. 3 and 7, in step 161, as described for FIG. 1, the search proxy 104 secures the protected document fields within the document record 123 by cryptographically tokenizing plaintext words within those document fields and replacing the protected document fields with the corresponding cryptographically-tokenized fields. In step 162, the search proxy 104 aggregates the same protected document fields and encrypts them. In step 163, the search proxy 104 appends the resulting encrypted document field from step 162 to the document record from step 161. In step 164, the search proxy 104 sends the resulting modified document record to the ready-made search software 103. In this case, the search keys and encryption keys are managed or generated from the key management system 114 with search keys unique to the tenant 115 (i.e., tenant-specific search keys). As previously discussed, if there are two or more protected fields, these can be protected by two or more search keys. Separate search keys could be used for each protected field, for example, the name field could have one search key and address field could have another. The ready-made search software 103 indexes the cryptographically-tokenized words from within the protected fields in the same way it indexes words from non-protected fields and stores them in a search index 125. To create the encrypted document field, the search proxy 104 can concatenated or otherwise combine the two or more protected fields together and the resulting combination can be encrypted. The ready-made search software 103 stores the document record, including the encrypted document field, in data storage 126.

Referring to FIG. 4, the user of client device 116 of tenant 115, may later wish to recover the document record 123 of FIG. 3. Referring to FIGS. 4 and 8, where called-out elements refer to FIG. 4 and steps refer to FIG. 8, in step 165, the user of client device 116, through the user interface of the vendor application 107, enters some search terms and generates a search query 127. In step 166, the search proxy 104 transforms the search terms into cryptographic tokens using the same tenant-specific search key that created the cryptographically-tokenized words stored in the search index 125. In step 167, the search proxy 104 sends the resulting cryptographically-tokenized search query to the ready-made search software 103.

Referring to FIG. 4, the ready-made search software 103 attempts to match the cryptographically-tokenized search terms within the cryptographically-tokenized search query with the cryptographically-tokenized words stored in the search index 125. As a result of matching the cryptographically-tokenized search terms in the cryptographically-tokenized search query with cryptographically-tokenized words stored in the search index 125, the ready-made search software 103 fetches each document record that matches the query from data storage 126 and returns it. These document records contain the cryptographic tokenized fields and the encrypted document.

Referring to FIGS. 4 and 9, where called-out elements refer to FIG. 4 and steps refer to FIG. 9, in step 168, the search proxy 104 receives the search results returned by the ready-made search software 103. In step 169, the search proxy 104 produces decrypted search results 128 by decrypting the encrypted document field returned from data storage 126, and in step 170, replacing protected fields (which contain cryptographically-tokenized words) in the document record returned by the ready-made search software 103 with the decrypted plaintext fields. The search proxy 104 decrypts the encrypted document field using the same client-specific encryption key used to encrypt the document record 123 of FIG. 3. In step 171, the decrypted search results 128 are returned to the client device 116. As discussed in FIG. 3, the communication channel 124 between the vendor application 107 and the client device 116 can be secured in transit using HTTPS.

In step 168, the search results could include the encrypted document field and a list of document record IDs. Alternatively, the ready-made search software could be configured so that the search results could include the list of document record IDs and not the encrypted document field. In the alternative case, the list of document record IDs would be passed through. Generally, in step 170, when the search proxy removes the cryptographically tokenized field from the search results, we can refer to these results as modified search results. The modified search results could include the decrypted search results 128, a list of document record IDs, or other information retrieved from the search results. Similarly, when the search proxy can remove the cryptographically-tokenized field from each modified document record in the search results, it thereby creates an updated document record. The search proxy returns the updated document record to the vendor application.

While FIGS. 3 and 4 show two tenants, tenant 115 and tenant 119, as a simplified example of two or more tenants, the search management system 100 is scalable to handle hundreds or even thousands of tenants. This is graphically represented by the three dots between the tenant boxes. Similarly, for ease of illustration, each tenant is illustrated with three client devices. However, the search management system can in fact be scaled to match the capabilities of the cloud service provider 113 and vendor application 107, where each tenant might have tens of thousands or even hundreds of thousands of client devices.

Figure 5:
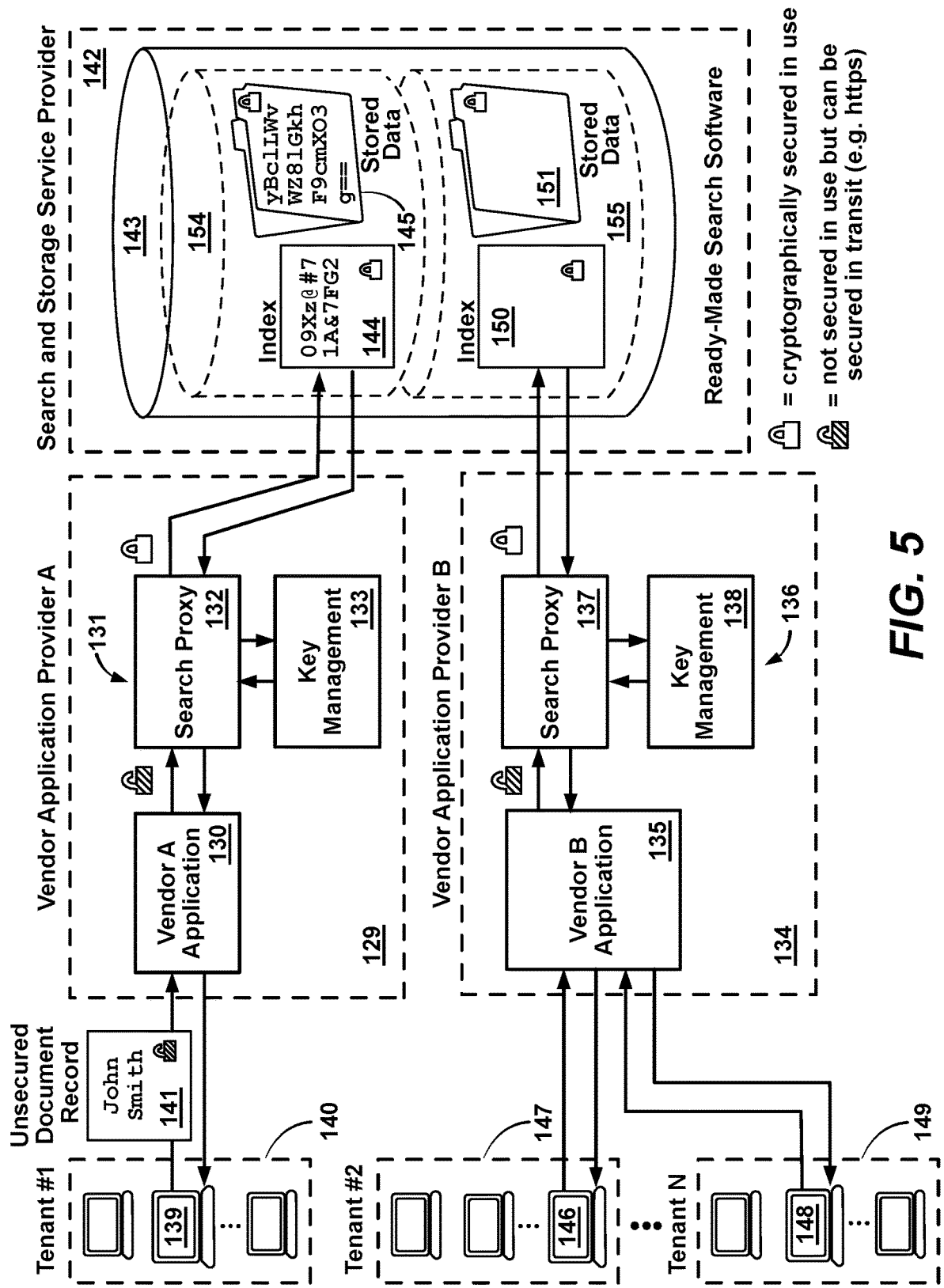
FIG. 5 illustrates an overview example of a search management system that can be used in a multi-tenant environment where search proxies and vendor applications are hosted within vendor application provider and illustrating the search proxy cryptographically securing an unsecured document, or document record, by data encryption and cryptographic tokenization.
Figure 6:
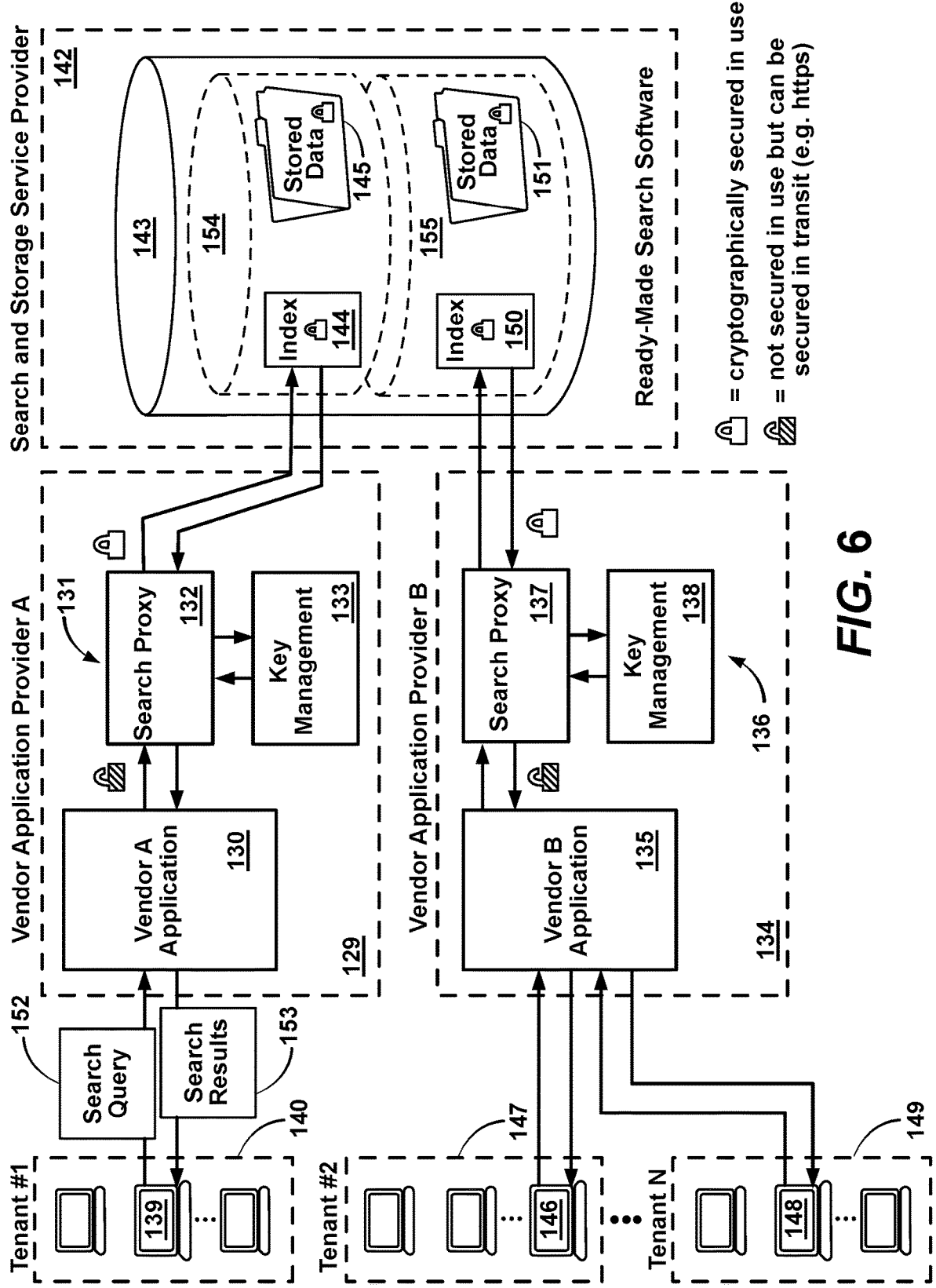
FIG. 6 illustrates sending a search query and receiving results with the search management system topology of FIG. 5.

FIGS. 5 and 6 illustrate a multi-tenant environment where two vendor application providers, vendor application provider 129 and vendor application provider 134, each host their own search management system installation, search management system 131 and search management system 136, respectively. Vendor application provider 129 also hosts the vendor application 130. Vendor application provider 134 hosts the vendor application 135. Vendor application 135 is illustrated as in communication with client device 146 of tenant 147 and client device 148 of tenant 149. A search/storage service provider 142 hosts ready-made search software that services both vendor application providers. The search management system 131 includes search proxy 132, and key management system 133. The search management system 136 includes search proxy 137, and key management system 138. The search proxy 132 is positioned between vendor application 130 and the ready-made search software 143. Likewise, search proxy 137 is positioned between vendor application 135 and the ready-made search software 143.

The principle of operation is essentially the same as described for FIGS. 3 and 4. Referring to FIG. 5, client device 139 of tenant 140 sends a document record 141 to be stored with search/storage service provider 142. The communication channel between the client device 139 and the vendor application 130 can be secured in transit by a public key encryption scheme such as HTTPS. Vendor application 130 authenticates the client device 139 and the tenant 140. The search proxy 132 performs cryptographic tokenization and encryption as described for FIG. 3 using tenant-specific search and encryption keys managed by key management system 133 and stores the resulting modified document, containing the cryptographically-tokenized protected fields, and the encrypted document record in the search index 144 and data storage 145, respectively.

Referring to FIG. 6, client device 139 of tenant 140 sends a search query 152 through the vendor application 130. As described in FIG. 3, the keywords within the search query are cryptographically tokenized, producing a cryptographically-tokenized search query. The ready-made search software 143 matches the cryptographically-tokenized keywords to the words stored in the search index 144. The ready-made search software 143 returns the document records matching the search from data storage 145. The search proxy 132 processes each returned document record; if any protected fields are included in a document, the proxy decrypts the encrypted document field, replaces the protected fields with the corresponding decrypted fields, and returns the decrypted document record 153 to the client device 139 via the vendor application 130. Alternatively, a list of document record IDs can be returned instead of returning the unencrypted document. The list of document record IDs could point to the encrypted documents, for example, via hyperlinks.

Referring to FIGS. 5 and 6, the search index 144 and data storage 145 are shown as an instance 154 of ready-made search software 143. The search index 150 and data storage 151 are shown as an instance 155 of the ready-made search software 143. These instances could be separated physically, for example separate servers, or could be virtualized separately on the same server. Alternatively, a shared search index, such as search index 150, and shared data storage, such as data storage 151 could be used across multiple tenants.

In FIGS. 3 and 4, search index 144 and data storage 145 are illustrated separately within instance 154. Similarly, the search index 150 and data storage 151 are illustrated separately within instance 155. While they can be physically separate or virtualized separately, typically the search index and data storage can be a single entity. The same can be true for the search index and data storage pairs illustrated in FIGS. 5 and 6.

Figure 10:
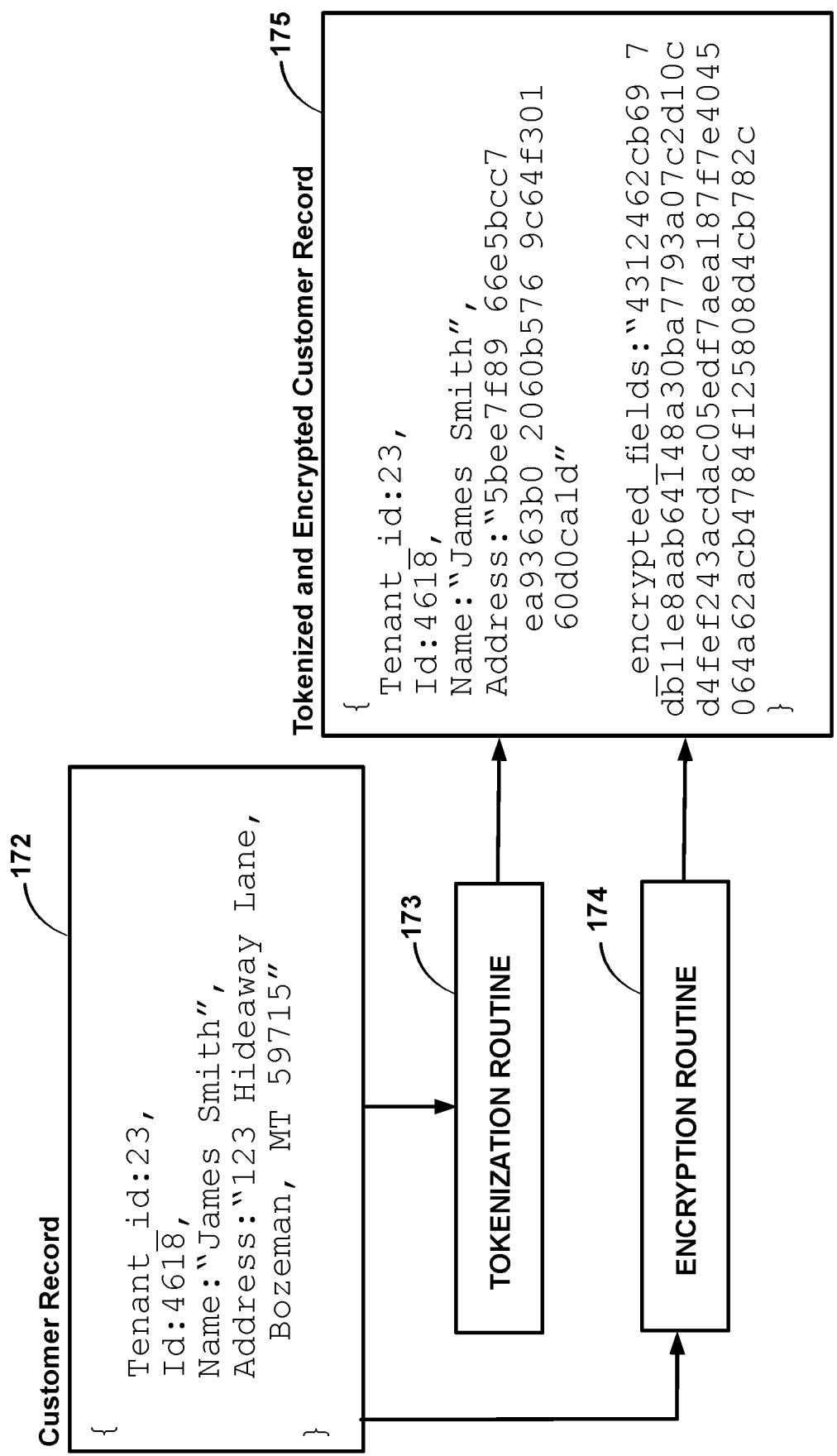
FIG. 10 illustrates an example of cryptographically tokenizing and encrypting a customer record into a cryptographically-tokenized and encrypted customer record.
Figure 11:
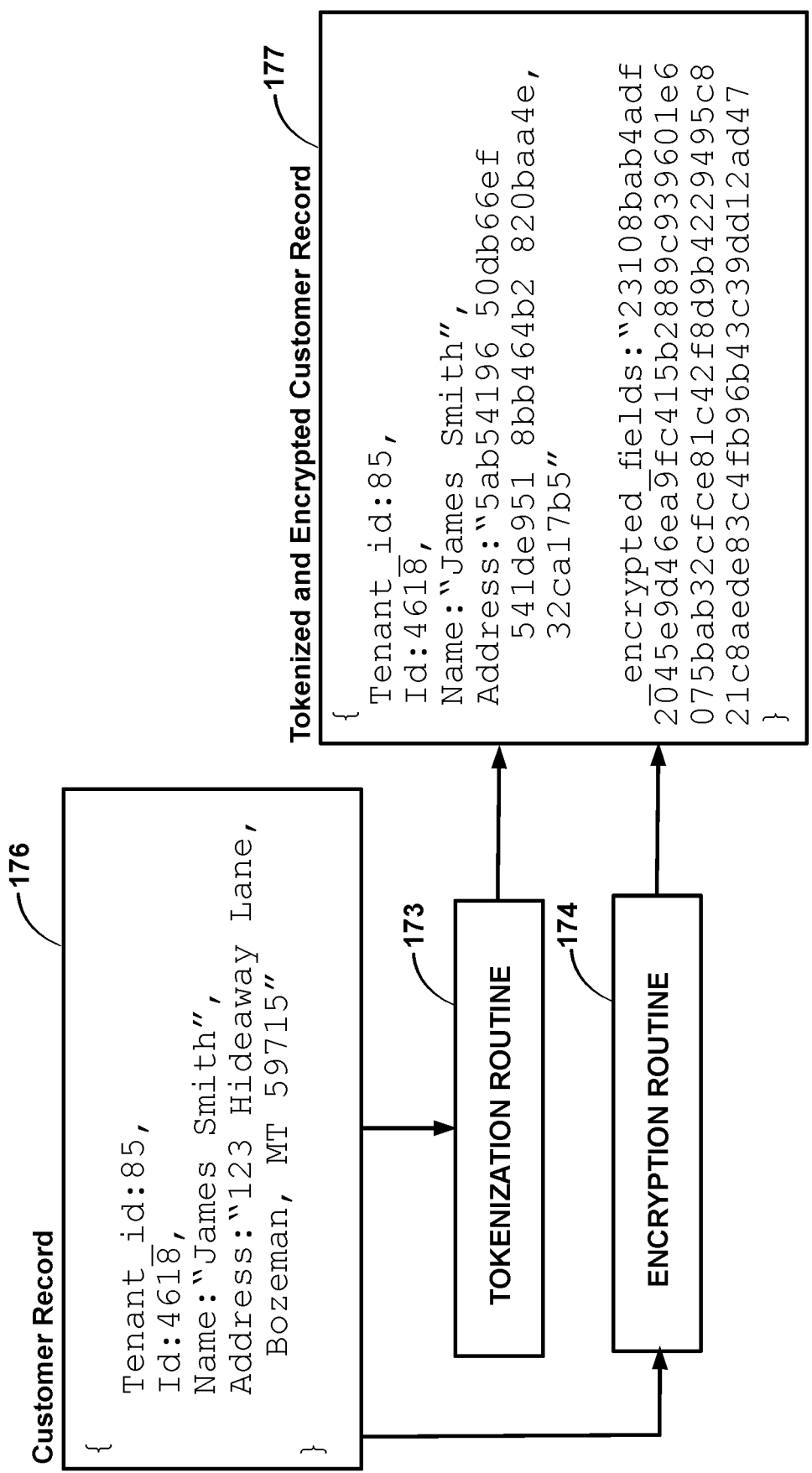
FIG. 11 illustrates how cryptographically tokenizing and encrypting the same data, in this case the data record of FIG. 10, with a different tenant ID produces a different cryptographically-tokenized and encrypted result.
Figure 13:
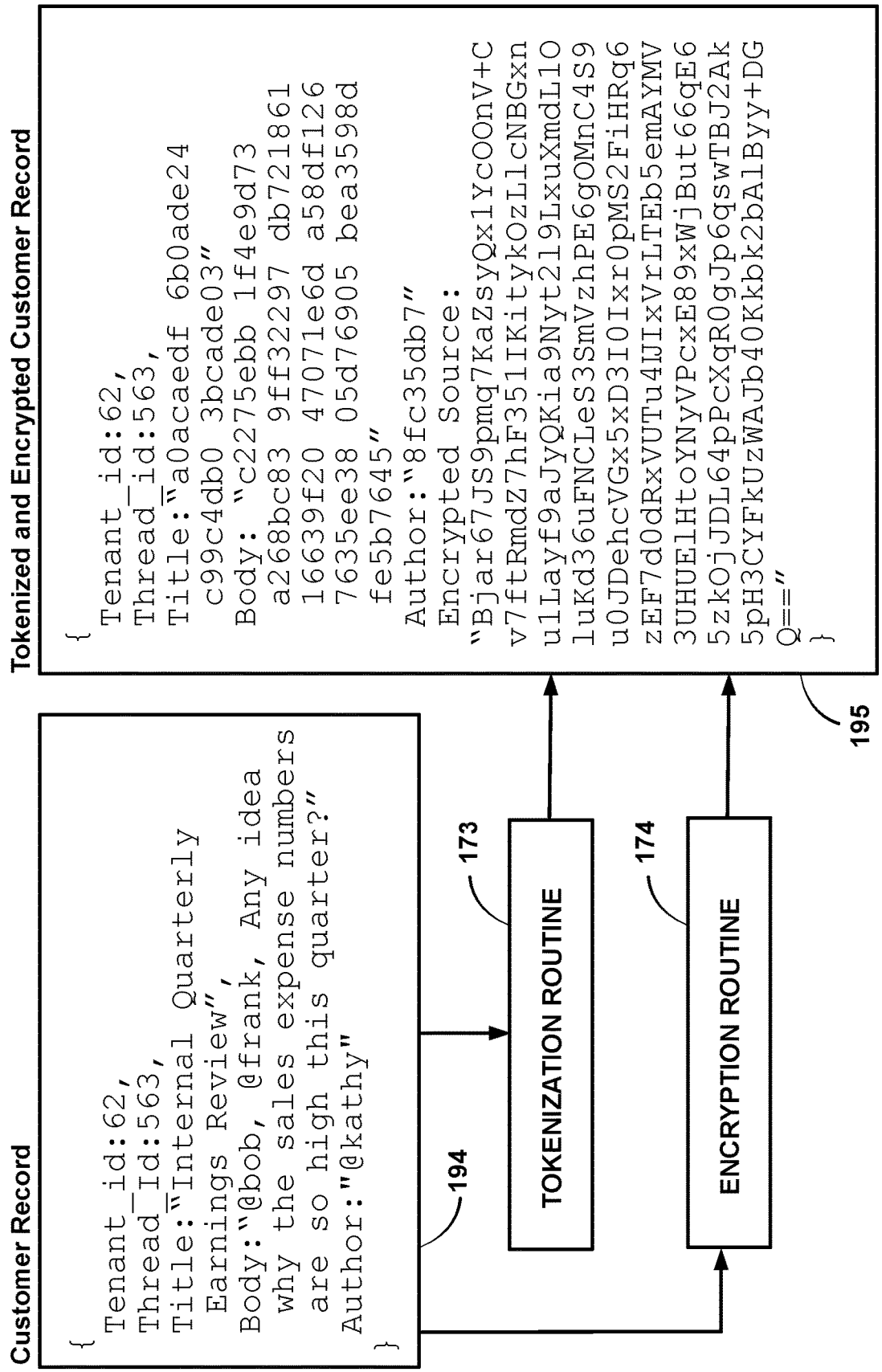
FIG. 13 illustrates an example of cryptographically tokenizing and encrypting a customer record into a cryptographically-tokenized and encrypted customer record that includes a message thread.

FIGS. 10-13 illustrate examples of cryptographically tokenizing and encrypting documents that can be applied to a multi-tenant environment. FIGS. 10 and 11 show an example of a document record containing personnel data, for example, an employee record in a human resources management system or a payroll record in a payroll management system. FIGS. 12 and 13, show an example of a document record containing messages; for example, email messages, text messages, or a messaging service within a project management application.

Referring to FIG. 10, the customer record 172 includes a tenant ID, a record ID, a name field, and an address field. A cryptographic tokenization routine 173 cryptographically tokenizes each word within the protected fields, according to the client's preference. In this example, the Address field is protected, while the Name field is unprotected and is left as plaintext words. The fictitious address, "123 Hideaway Lane, Bozeman, MT 59715," within the address field includes six "words" and is cryptographically tokenized as six fixed length hexadecimal cryptographic tokens in the secured-in-use document record 175. As previously discussed, the cryptographic tokens can be created from a deterministic keyed hash function, using client-specific keys. The address field, "123 Hideaway Lane, Bozeman, MT 59715," could be transformed into a hash using HMAC with SHA-256. As an example, the cryptographic tokenization routine 173, within the search proxy, using SHA-256 and a given tenant-specific key of 35a2f18e79364b179637daf, for the address field first word "123" could hash into "5bee7f89114e0d7f92def49708c1ee212d5ec214994909 ee499fc9f4a5cf1658." Similarly, using the cryptographic tokenization routine 173 and the same tenant-specific key, the address field second word "Hideaway" could compute into the hash "66e5bcc772cd4c0b22a7232970f24755c 3b75e445baed121 b8d67cc955833cb0." The cryptographic tokenization routine 173 could then create the token from a truncated portion of the hash, for example, the first eight characters. In this example, the address field first word yields the cryptographic token, "5bee7f89" as shown in the secured-in-use document record 175. Similarly, utilizing the first eight-character portion of the second word in the address field would yield the cryptographic token, "66e5bcc7" as also shown in secured-in-use document record 175. In this example, each tokenized word is truncated to eight-character hexadecimal words. As currently implemented, the search management system uses the same truncation of the hashes to eight-character (32-bit) hexadecimal words. The tokenization routine within the search proxy is not limited to hexadecimal characters or eight-character words. The tokens can be longer or shorter. Longer tokens, such as 16, 32, or 64 characters can be used. Longer token lengths produce better search results, since there is a lower probability that two different words will produce the same token. However, these "collisions" introduced by using shorter tokens increase the difficulty of applying frequency analysis to the tokens to attempt to identify the original words, increasing the security of the stored data.

In order to make the cryptographically-tokenized document fields recoverable from the responses returned by the ready-made search software to a search query, an encryption routine 174 aggregates the document record's protected fields and reversibly encrypts them. As previously discussed, an example of reversible and symmetric encryption routine suitable for this task is AES-256, which is a block cipher and a National Institute of Standards and Technology standard. Other examples include block ciphers like Threefish or stream ciphers like Salsa20. The resulting encrypted field is appended to the document to create a secured-in-use document record 175.

The cryptographically-tokenized fields use separate unique search keys for each tenant (i.e., a tenant-specific search key). This ensures that the same or similar data would be cryptographically tokenized differently for each tenant. FIG. 11 demonstrates how using a different client-specific search key will yield different results for the same information within a document record. In FIG. 11, customer record 176 contains the same ID, Name, and Address field contents but belong to different tenants, identified via the Tenant_ID field. Because FIGS. 10 and 11 are from different clients, the cryptographic tokenization routine 173 and encryption routine 174 in FIG. 11 use a different tenant-specific search key and a different tenant-specific encryption key than those of FIG. 10. For this reason, the secured-in-use document record 177 that results in FIG. 11 is different from the secured-in-use document record 175 of FIG. 10.

FIG. 12 illustrates a conceptual representation of a portion of an index from the ready-made search system that includes indexed words from FIGS. 10 and 11. Referring to FIG. 12, the name field 178 shows two indexed plaintext words, "james" in row 179 and "smith" in row 180 corresponding to the name field in customer record 172 of FIG. 10 and customer record 176 of FIG. 11. In the example of FIGS. 10 and 11, the name field was identified as unprotected, so its content in each document was indexed as plaintext words. Referring to FIG. 12, row 179 shows the indexed word "james" is associated with the tenant ID no. 23 from FIG. 10 and the tenant ID no. 85 from FIG. 11. It is also associated with two documents; document no. 1 is the encrypted document appended to the secured-in-use document record 175 of FIG. 10 and document no. 2 is the encrypted document appended to the secured-in-use document record 177 of FIG. 11.

Referring to FIG. 12, the address field 181 corresponds to the address fields FIGS. 10 and 11. Row 182, 183, 184, 185, 186, 187 correspond to the cryptographically-tokenized words in the address field of the secured-in-use document record 175 of FIG. 10, which are associated with document no. 1. Row 188, 189, 190, 191, 192, 193 correspond to the cryptographically-tokenized words in the address field of the secured-in-use document record 177 of FIG. 11, which are associated with document no. 2.

FIG. 13 illustrates an example of cryptographically tokenizing and encrypting a customer record 194 into a secured-in-use document record 195 that includes a message thread, where the customer record exists in a multi-tenant environment. In this example, the title field, body field, and author field are all secured by cryptographic tokenization using cryptographic tokenization routine 173 and are also aggregated and encrypted using encryption routine 174. Both the cryptographic tokenization routine 173 and the encryption routine 174 can operate as described for FIGS. 10 and 11. For example, the title field contains four words that can be individually cryptographically tokenized by using a client-specific search key, using an irreversible hash function, HMAC and SHA-256 with a predetermined number of characters selected from the hash to create the cryptographic token, as previously described.

In order to further enhance security, as previously discussed, each field can be assigned its own client-specific search key. For example, the title field, body field, and author field can all use a different client-specific key to generate the hashes and resulting cryptographic tokens.

Figure 14:
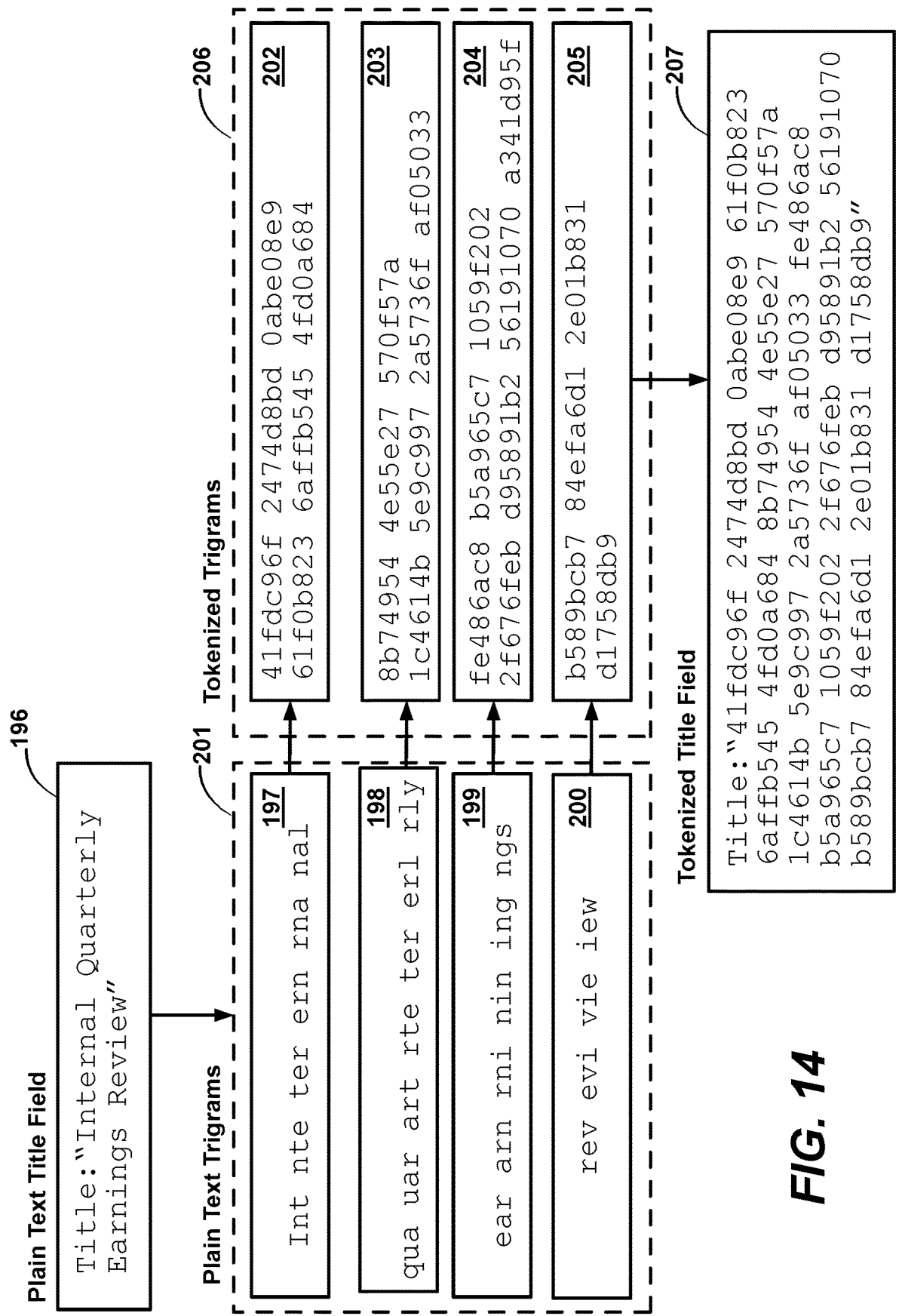
FIG. 14 illustrates an example of dividing a field into two or more overlapping n-grams before cryptographically tokenizing to allow for wildcard searches; in this particular example, the title field of FIG. 13 is divided into trigrams before cryptographic tokenization.

One of the advantages of the search management system is that it allows wildcard searching and some other more sophisticated search methods. FIG. 14 shows how wildcard searching can be accomplished by dividing each word within a protected field into a sequence of two or more overlapping n-grams. An n-gram is a sequence of n consecutive characters. A sequence of two or more overlapping n-grams is one in which adjacent n-grams in the sequence share n−1 characters. After the first n-gram is formed from the first n characters of a word, the next n-gram starts with the second character, the next with the third character, and so forth. For example, the word, "example" could be split into a sequence of bigrams (i.e., n=2), ex, xa, am, mp, pl, le. It could be split into a series of trigrams (i.e., n=3), exa, xam, amp, mpl, pie. It could be split into a series of 4-grams (i.e., n=4), exam, xamp, ampl, mple.

The two or more overlapping n-grams can be cryptographically tokenized, as previously described. The resulting cryptographically-tokenized n-grams can then replace the plaintext field in the modified document record. In FIG. 14, the plaintext title field 196, taken from the customer record 194 of FIG. 13, is split into trigrams or 3-grams. The four-word title field becomes four trigram sequences, trigram sequence 197, 198, 199, 200 of the trigram module 201, which then results in cryptographically-tokenized trigram sequence 202, 203, 204, 205 of tokenized trigram module 206, respectively. The sequences of trigrams are then assembled into a cryptographically-tokenized title field 207. The same procedure can be applied to other n-grams, for example, bigrams or 4-grams.

Figure 15:
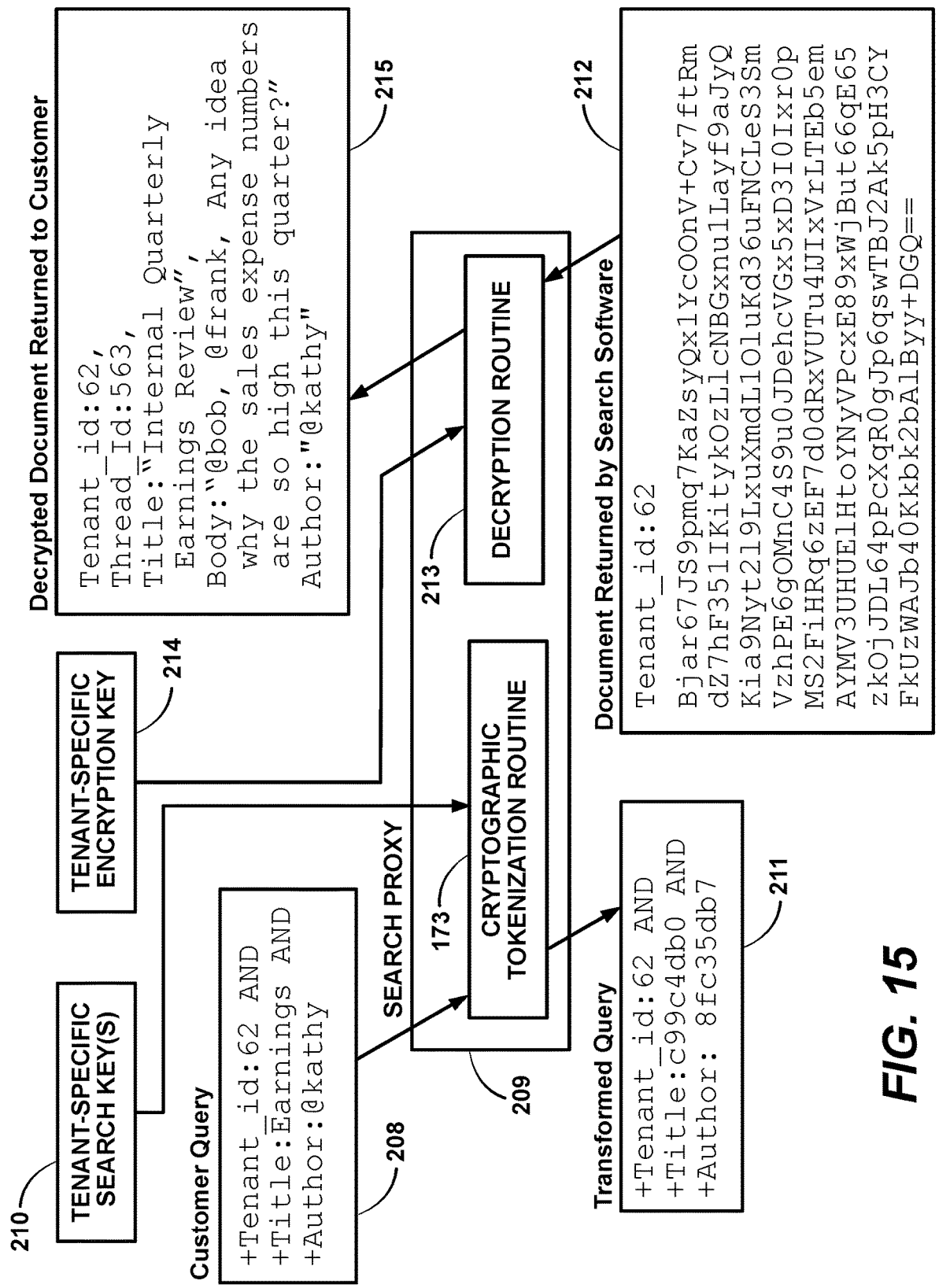
FIG. 15 illustrates round-trip query and results, using as an example a query from the title field and author field of FIG. 13.
Figure 16:
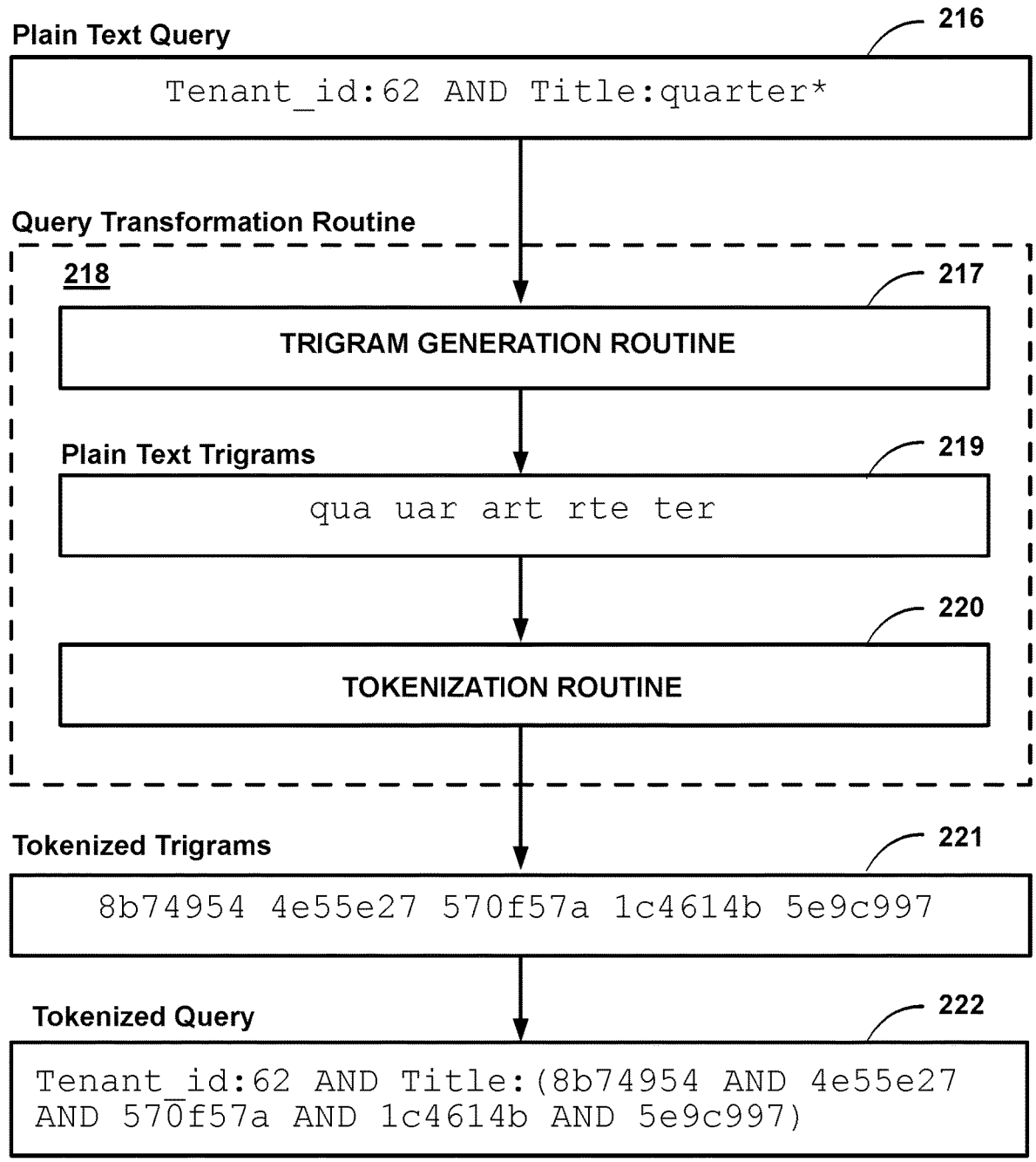
FIG. 16 illustrates an example of cryptographically tokenizing plaintext words within a query using the two or more overlapping n-grams while processing the search query; in this case, a portion of the title field of FIG. 13 is divided into overlapping trigrams before cryptographic tokenization.
Figure 17:
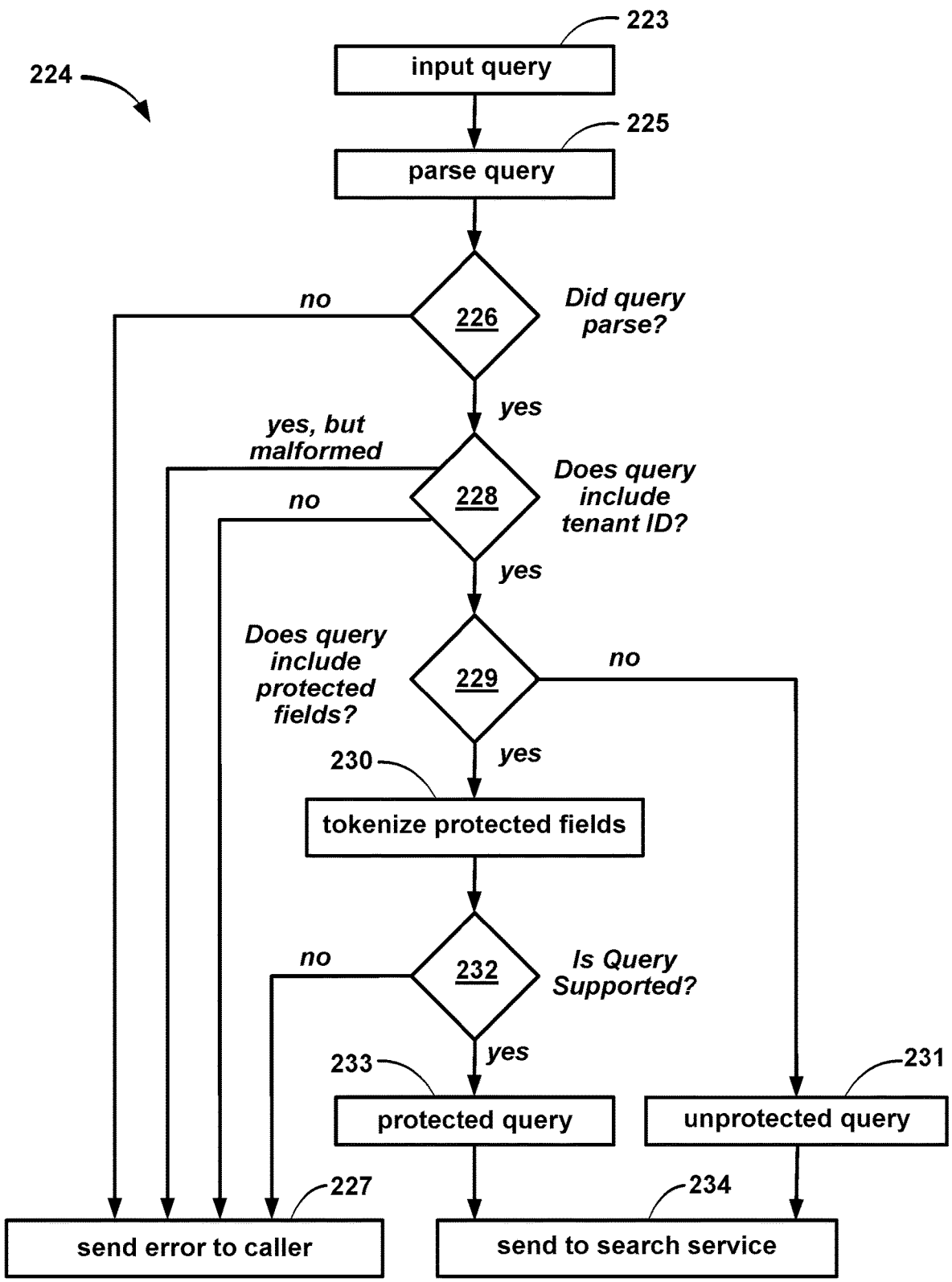
FIG. 17 illustrates a typical query validation flow chart.
Figure 18:
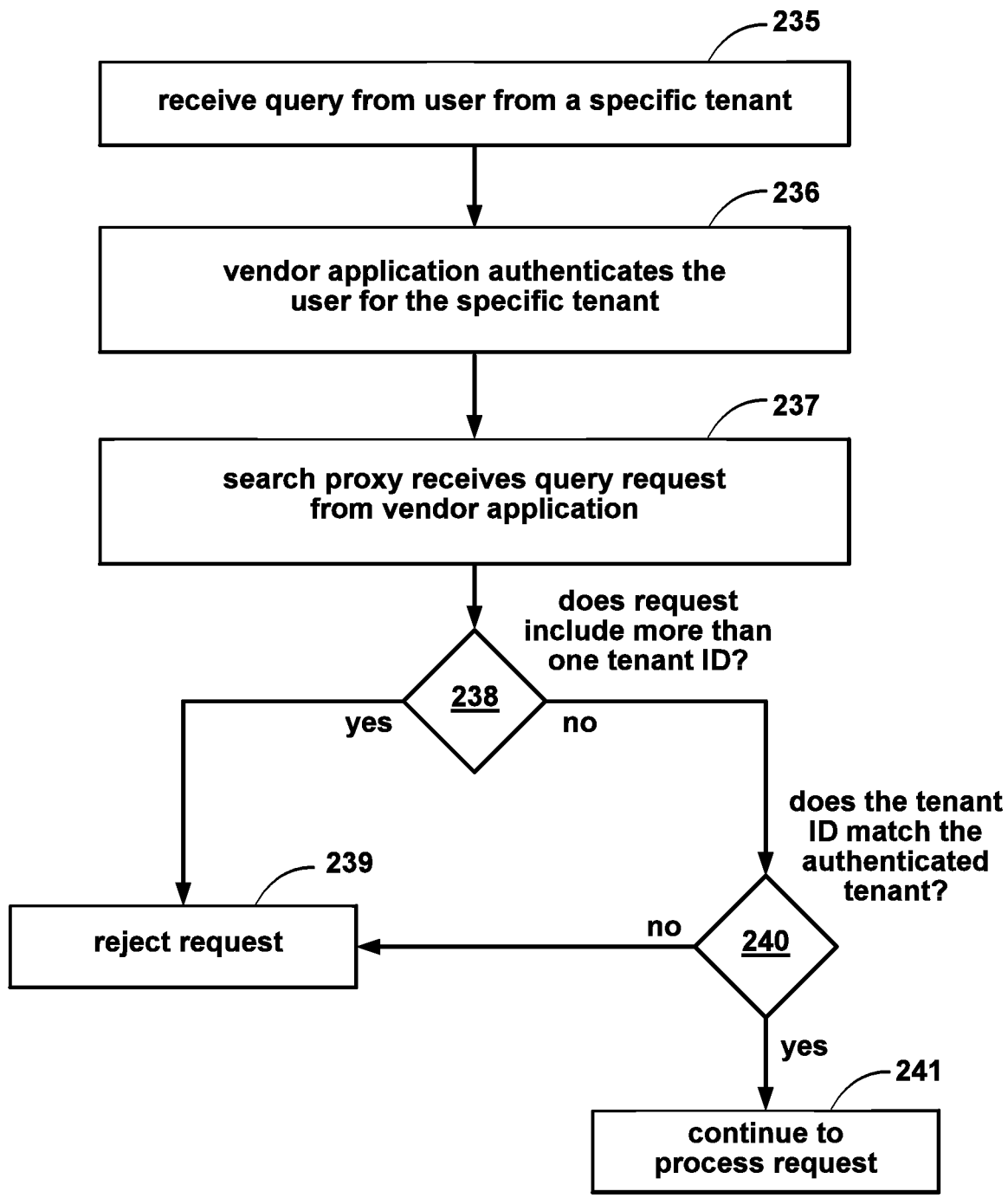
FIG. 18 illustrates a typical flow chart of how the search management system can avoid a multi-tenant ID injection attack.

FIGS. 15-18 illustrates various aspects of search queries and results associated with the search management system. FIG. 15 illustrates round-trip query and results, using as an example, a query from the title field and author field of FIG. 13. FIG. 16 illustrates an example of cryptographically tokenizing plaintext words within a search query using two or more overlapping n-grams before cryptographically tokenizing the search query. In this case, a portion of the title field of FIG. 13 is divided into trigrams before cryptographic tokenization to produce cryptographically-tokenized n-grams. FIG. 17 illustrates a flow chart showing an example of search query validation module 224 to validate the search queries within the search management system. FIG. 18 illustrates a typical flow chart of how the search management system can avoid a multi-tenant ID injection attack.

Referring to FIG. 15, as an example, a user associated with tenant ID no. 62 is looking for a message from Kathy that discusses an earnings report. The user might enter a query for Kathy in the author field and earnings in the title field. This could transform into a customer search query 208 as shown, embedded with the tenant ID. The search proxy 209 uses the cryptographic tokenization routine 173 and a tenant-specific search key 210 to transform the search query into field names with associated cryptographic tokens joined by conjunctions. Here the search proxy 209 transformed the query "+Tenant_ID:62 AND +Title:Earnings AND +Author: @Kathy into the transformed search query 211, "+Tenant_ID:62 AND +Title:c99c4db0 AND +Author: 8fc35db7" by cryptographically tokenizing the terms "Earnings" and "@Kathy." The tenant-specific search key 210 is the same tenant-specific search key used by the cryptographic tokenization routine 173 of FIG. 13. Because the hash functions used to create the cryptographic tokens in both FIGS. 13 and 15 are deterministic, the same words yield the same results, as illustrated.

The transformed search query 211 is sent to the ready-made search software. The ready-made search software processes the transformed search query 211 and compares the keywords to the word values in its index. The ready-made search software returns each document matching the search query (or a subset of the fields, if the query requests specific fields). Each document might include cryptographically-tokenized fields, as well as the encrypted document record 212 associated with the document. If there are any protected fields, the decryption routine 213 within the search proxy 209 decrypts the encrypted document record 212 using the tenant-specific encryption key 214 that was used to encrypt the document. The search proxy 209 replaces the cryptographically-tokenized fields with the corresponding plaintext fields from the document that was decrypted by the decryption routine. The decrypted document record 215 is returned to the customer via a vendor application, such as the vendor application 107 of FIG. 3.

If the search proxy generated two or more overlapping n-grams from words within a protected document field before cryptographically tokenizing them, then it can process a search query that requests a substring match rather than a match on complete words. This is indicated by using a wildcard character in a search term; for example, "title: Earn*" instead of "title:Earnings" requests any documents where words in the title field start with "Earn." If a wildcard term is specified in a search query, the search proxy would break the keyword into two or more overlapping n-grams and produce cryptographically-tokenized n-grams. As an example, assume the search proxy first broke up words within protected document fields into overlapping trigrams before cryptographically tokenizing them. With this assumption, in FIG. 16, a search term containing a wildcard would also be split into overlapping trigrams before cryptographic tokenization. Here, the search query 216 is from tenant ID no. 62 and includes the word quarter with a wild card suffix in the title field. The trigram generation routine 217 within the query transformation routine 218, takes the keyword "quarter" and splits it into overlapping trigrams 219 "qua," "uar," "art," "rte," and "ter." The tokenization routine 220 cryptographically tokenizes each trigram using the same client-specific search key as used to cryptographically tokenize words within a document record. The search proxy replaces the original plaintext keywords with cryptographically-tokenized trigrams, as illustrated in transformed query 222. The cryptographically-tokenized trigrams are offset by the conjunction "AND." In this example, the tokenized trigram sequence 221 would be "8b74954 4e55e27 570f57a 1c4614b 5e9c997" and the transformed query would be "Tenant_ID:62 AND Title:(8b74954 AND 4e55e27 AND 570f57a AND 1 c4614b AND 5e9c997)" where the conjunction "AND" joins each trigram within the sequence.

FIG. 17 illustrates a typical search query validation flow chart. In step 223, the search query validation module 224 receives an input search query, for example, customer search query 208 of FIG. 15. In step 225, the search query is parsed, separating keywords and operators. In step 226, the resulting parsed search query is tested to determine whether it properly parsed. If the search query did not parse, then in step 227, an error is sent to the caller, for example the client device 116 of FIG. 4 via the vendor application 107. In FIG. 17, if the search query did parse, in step 228, the search query is checked to see if it includes a tenant ID. If a tenant ID is not included, is malformed or invalid, in step 227, an error is sent to the caller as described in the previous step above. In step 229, if the search query includes protected fields, or if all fields are configured as protected, then in step 230, the words within the protected fields are run through the tokenization routine, for example, the cryptographic tokenization routine 173 of FIG. 15. If in step 229, the search query does not include protected fields, then in step 234, the unprotected search query 231 is sent to the ready-made search software.

Returning to the results of step 230, in step 232, the cryptographically-tokenized queries are checked to make sure they are supported. For example, a search query that includes more than one tenant ID is not supported. If the search query is supported, then in step 234, the protected search query 233 is sent to the ready-made search service. If in step 232, the search query is not supported, the search proxy sends an error message to the caller, typically the client device via the vendor application.

A multi-tenant ID injection attack is when a person attempts to gain access to the data of two or tenant at one time. For example, if a hacker were to authenticate as a user associated with one tenant, they might attempt to gain access to the data of other tenants being hosted by the same cloud service provider by injecting data in the search string that attempts to circumvent the protections added to the search query to restrict access to only that tenant's data. FIG. 18 illustrates a typical flow chart of how the search management system can avoid a multi-tenant ID injection attack. In step 235, the vendor application receives a search query from a user of a specific tenant. In step 236, the vendor application authenticates the user for that specific client, for example the vendor application 107, and client device 116 of FIG. 4. In step 237, the search proxy receives the authenticated query from the vendor application. In step 238, the search proxy tests the search query to see if the query contains more than one tenant ID. If it does, then in step 239, the search query is rejected. If the query contains a single tenant ID, the search query is submitted to the ready-made search service.

Figure 19:
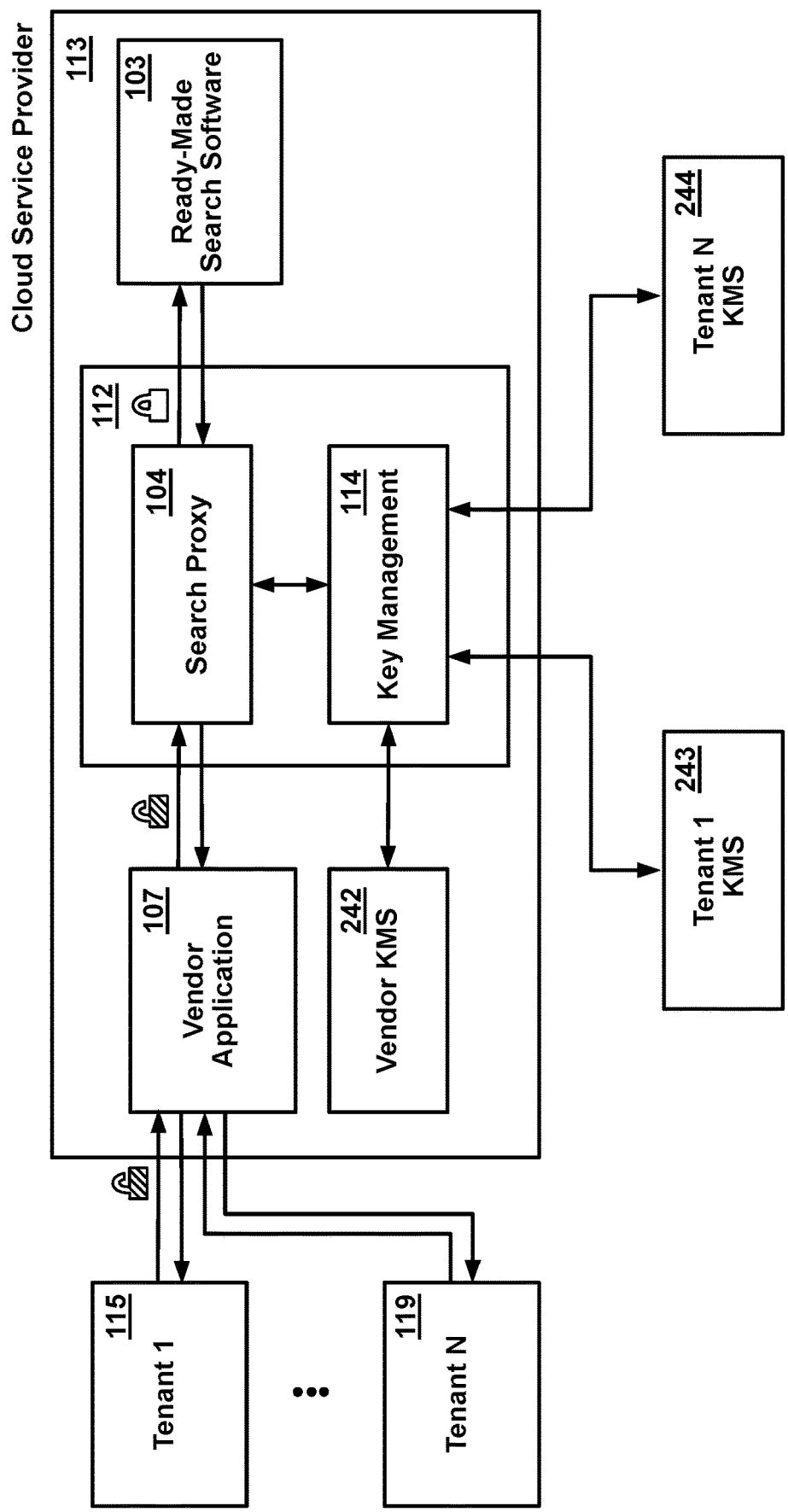
FIG. 19 illustrates an example of key management where the vendor application, search proxy, and ready-made search software reside with one cloud service provider.

FIGS. 19-26 discuss key management for a multi-tenant system in more detail. FIG. 19, illustrates a scenario similar to FIG. 3 where a cloud service provider 113 hosts the vendor application 107, the search management system 112, and the ready-made search software 103. The search management system includes search proxy 104 and key management system 114, as previously described. The key management system 114 is specifically associated with the search proxy 104. The vendor application can authenticate authorized users for each tenant. FIG. 19, as in FIG. 3, shows examples of two tenants, tenant 115 and tenant 119. As previously described, this is a simplified example of two or more tenants. Vendor applications within a cloud management system are often capable of managing hundreds of tenants and tens to hundreds of thousands of authenticated users and the search management system 100 is capable of handling these scenarios. In FIG. 19, the key management system 114, can manage tenant-specific encryption keys. These can be controlled by a vendor key management system or key management systems for individual tenants. Examples of vendor and tenant key management systems include vendor key management system 242, tenant key management system 243, and tenant key management system 244.

Figure 20:
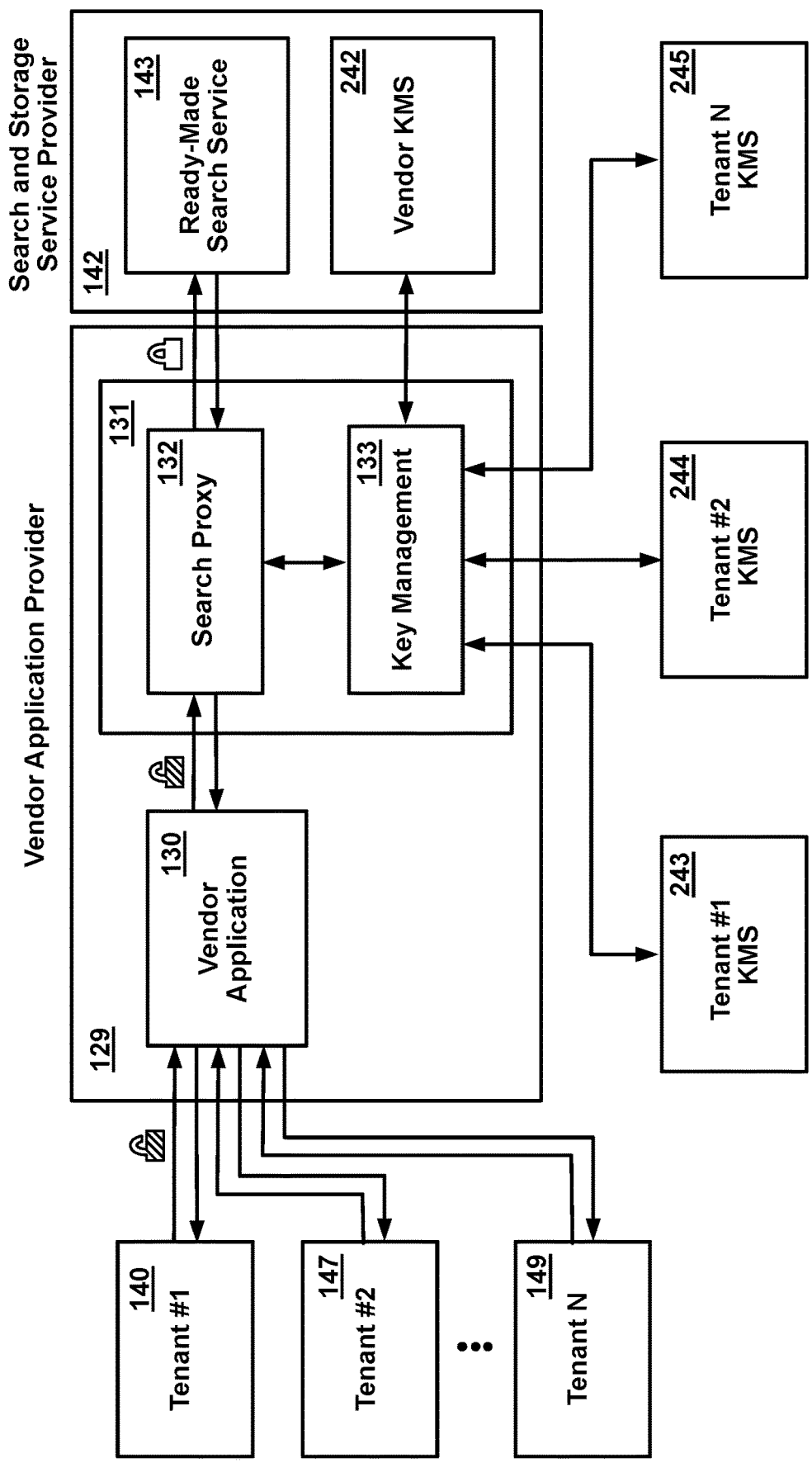
FIG. 20 illustrates an example of key management where the vendor application and search proxy reside with a vendor application provider, and ready-made search software resides with a search and storage service provider.

FIG. 20 illustrates a scenario similar to FIG. 5, except for simplification, there is one vendor application provider. In FIG. 20, the search/storage service provider 142 hosts the ready-made search software 143. The vendor application provider 129 hosts the vendor application 130 and the search management system 131. The search management system includes search proxy 132 and key management system 133, as previously described. The key management system 133 is specifically associated with search proxy 132. The vendor application 130 can authenticate authorized users for each tenant; for example, tenant 140, 147, 149. As with FIG. 19, this is a simplified example and the same discussion about system scaling applies. In this example, the search/storage service provider 142 hosts the vendor key management system 242, but this can also be hosted by the vendor application provider 129. As in FIG. 19, the key management system 133 can manage client-specific search keys and tenant-specific encryption keys from a vendor key management system 242 or from key management systems managed by the tenants, for example, tenant key management system 243, 244, 245.

Figure 21:
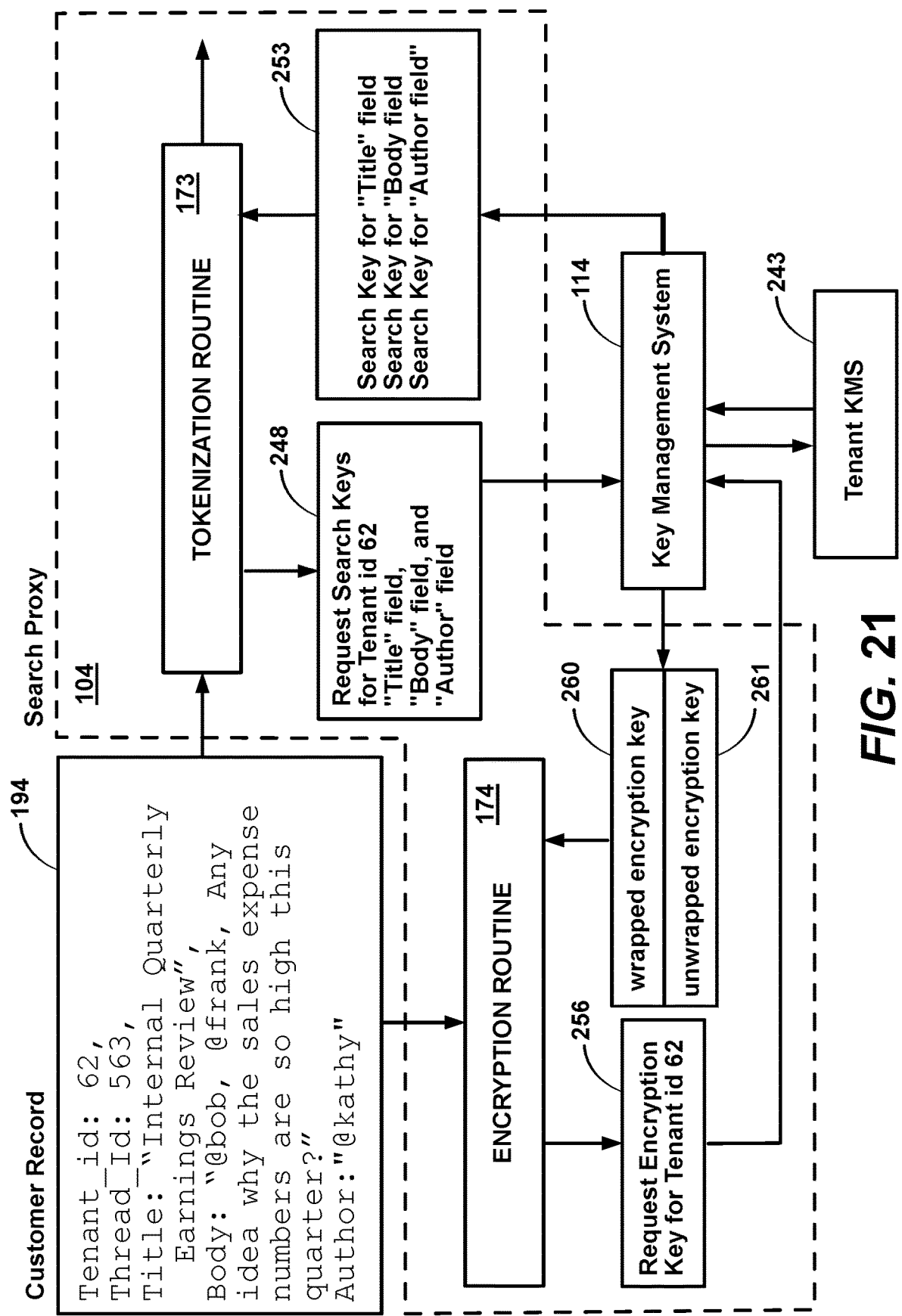
FIG. 21 illustrates how key management can be applied to the example of FIG. 13.
Figure 22:
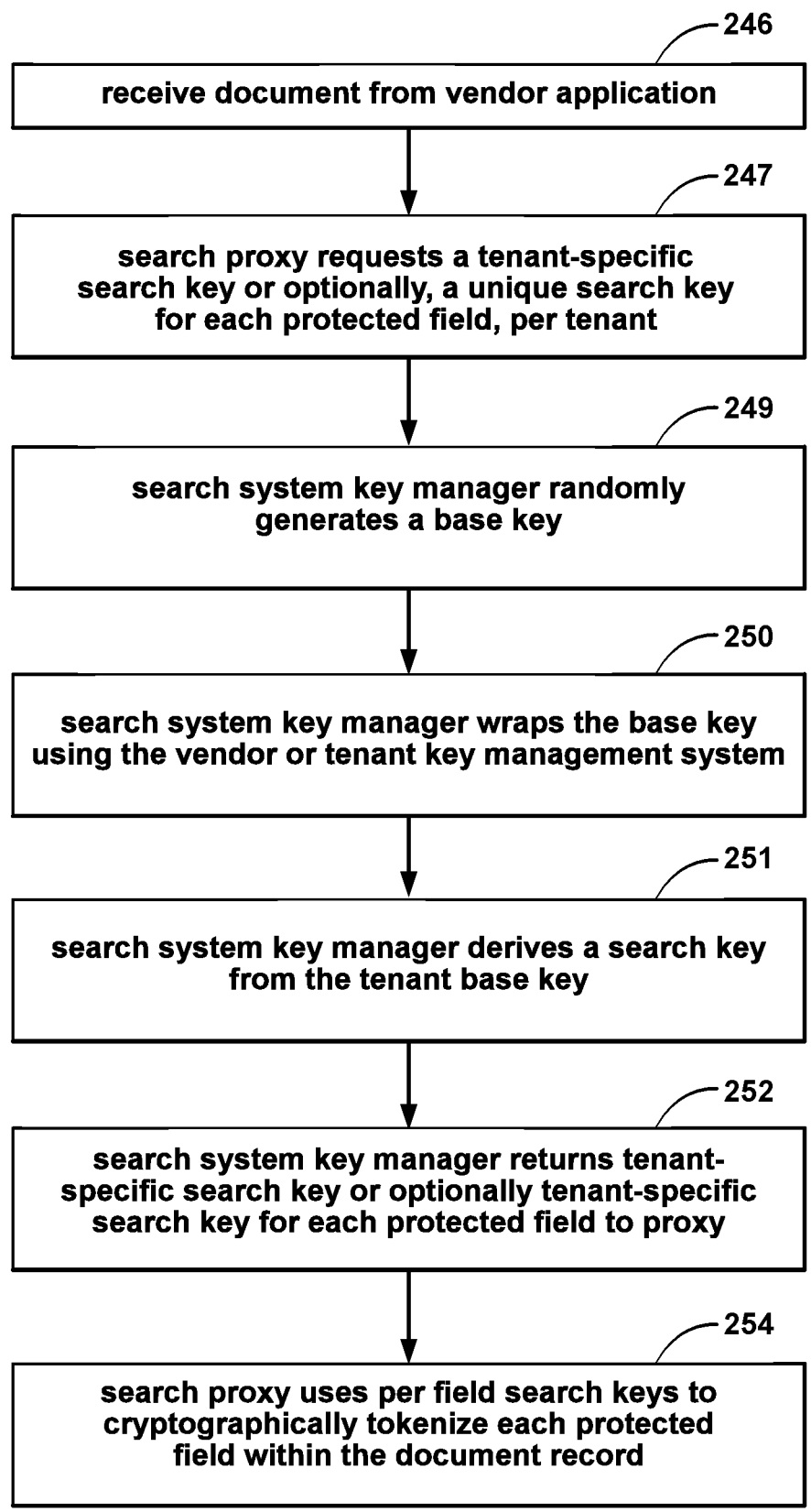
FIG. 22 illustrates a typical flow chart showing key management of the cryptographically tokenization portion of FIG. 21.
Figure 23:
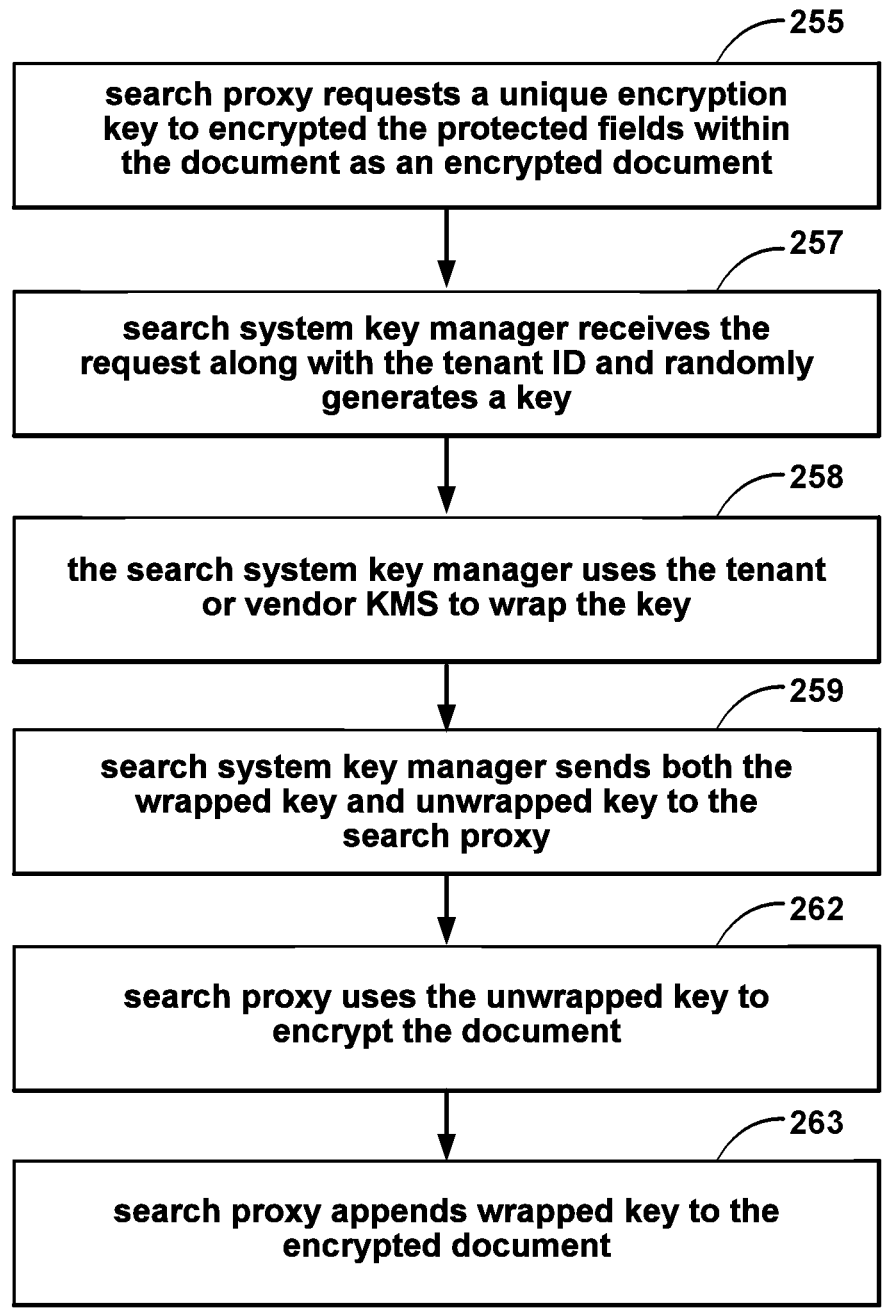
FIG. 23 illustrates a typical flow chart showing key management of the document encryption portion of FIG. 21.

FIG. 21 illustrates an example of key management applied to the customer record 194, cryptographic tokenization routine 173, and encryption routine 174. FIGS. 22 and 23 illustrate flow charts showing key management of the cryptographic tokenization portion (FIG. 22) and the document encryption portion (FIG. 23) of FIG. 21.

Referring to FIG. 21, the protected fields within the customer record 194 get cryptographically tokenized by the cryptographic tokenization routine 173 and encrypted by the encryption routine 174 as described for FIG. 13. The cryptographic tokenization routine 173 and the encryption routine 174 reside within the search proxy 104.

Referring to FIGS. 21 and 22, where steps refer to FIG. 22, in step 246, the customer record 194 is received by the cryptographic tokenization routine 173. In step 247 the search proxy 104, through a key management request 248, requests a tenant-specific search key. Optionally the search proxy can request separate tenant-specific search keys for each protected field. The key management system 114 maintains a base search key for each tenant; if it does not have a base search key for that tenant, in step 249, it randomly generates a base search key. In step 250, the key management system 114 uses the tenant key management system 243 to wrap, i.e., encrypt, that base search key. Optionally, the vendor key management system could be used to wrap the key if a tenant key management system was not available. The key management system 114 stores that wrapped base search key in memory associated with the ID of the tenant, in this example tenant ID no. 62. In step 251, once the key management system 114 has a base search key for the tenant, it derives a search key for the requested index and field using a cryptographically-secure derivation mechanism, for example HMAC and SHA-256 with the index and field names appended to form the string that is hashed using the search key. In step 252 the resulting tenant-specific search key or keys are sent to the search proxy. In this example, the key management system 114 returns a tenant-specific search key for each protected field to search proxy 104 as illustrated in block 253. Here, a tenant-specific search key is generated for each of the "title, "body," and "author" fields. In step 254, the cryptographic tokenization routine 173 cryptographically tokenizes each word within each protected field with the corresponding field-specific search key. The cryptographic tokenization routine is discussed in detail in the discussion of FIG. 13.

Referring to FIGS. 21 and 23, where steps refer to FIG. 23, in step 255, the search proxy 104 makes a tenant-specific request 256 to obtain an encryption key to use to encrypt the aggregated protected fields. In this example, the request is made on behalf of tenant no. 62. The aggregated protected fields in FIG. 21 are the title, author, and body fields of customer record 194. In step 257, the key management system 114 randomly generates a key. In step 258, the key management system 114 wraps the generated key using the tenant key management system 243. Optionally, the key management system 114 can use the vendor key management system (not shown), to wrap the generated key. In step 259, the key management system 114 sends the wrapped encryption key 260 and the unwrapped encryption key 261 to the search proxy 104. In step 262, the encryption routine 174 within the search proxy 104 encrypts the protected fields using the unwrapped encryption key 261. The encryption routine 174 typically uses a symmetric reversible encryption routine, such as AES-256, as previously discussed. In step 263, the search proxy 104, appends the wrapped encryption key 260 to the aggregated encrypted protected fields. As previously discussed, the aggregated encrypted protected fields are appended to the document record containing the cryptographically-tokenized fields.

Figure 24:
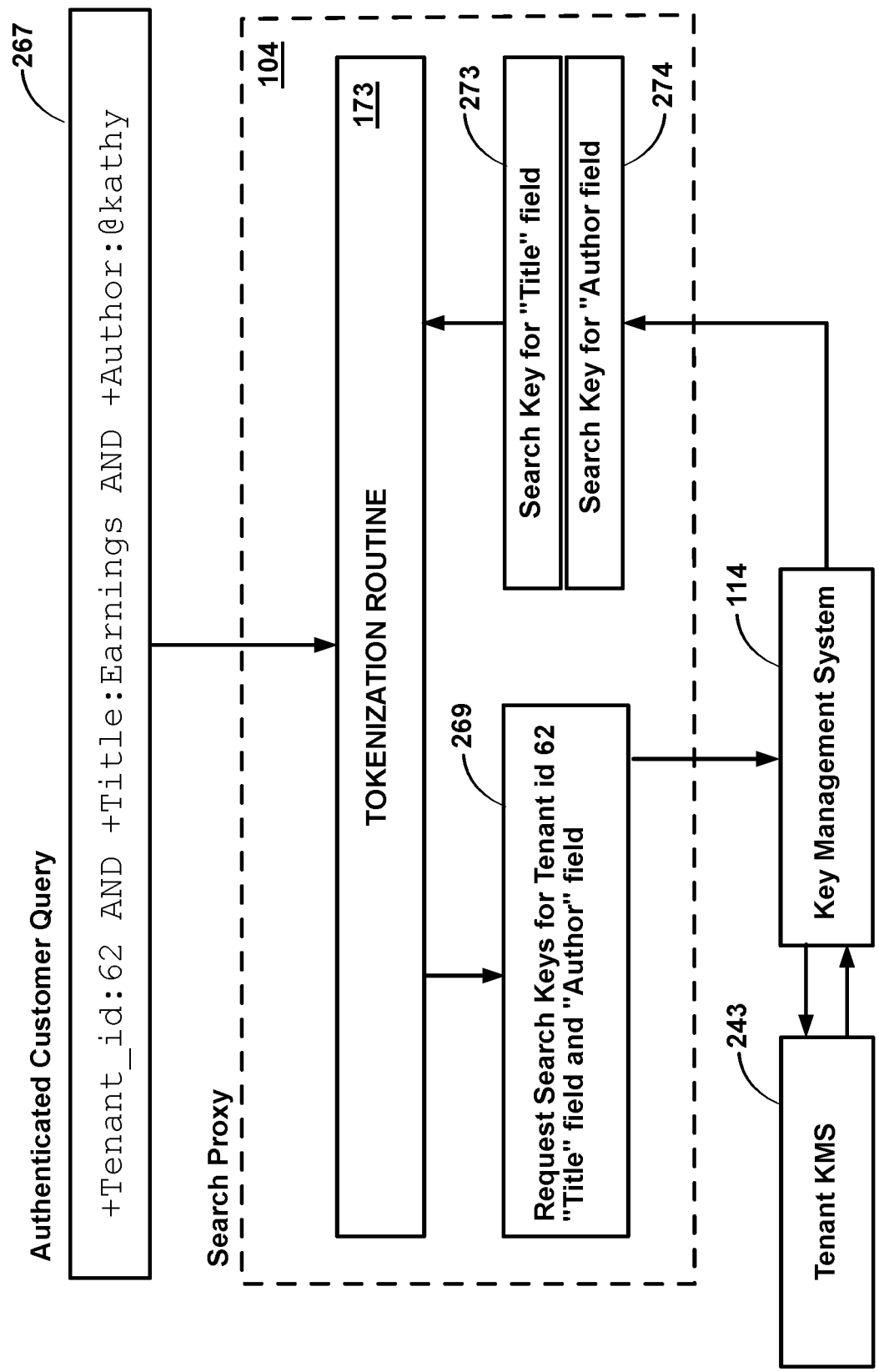
FIG. 24 illustrates key management typical for a search query, in this case, the search query of FIG. 15.
Figure 25:
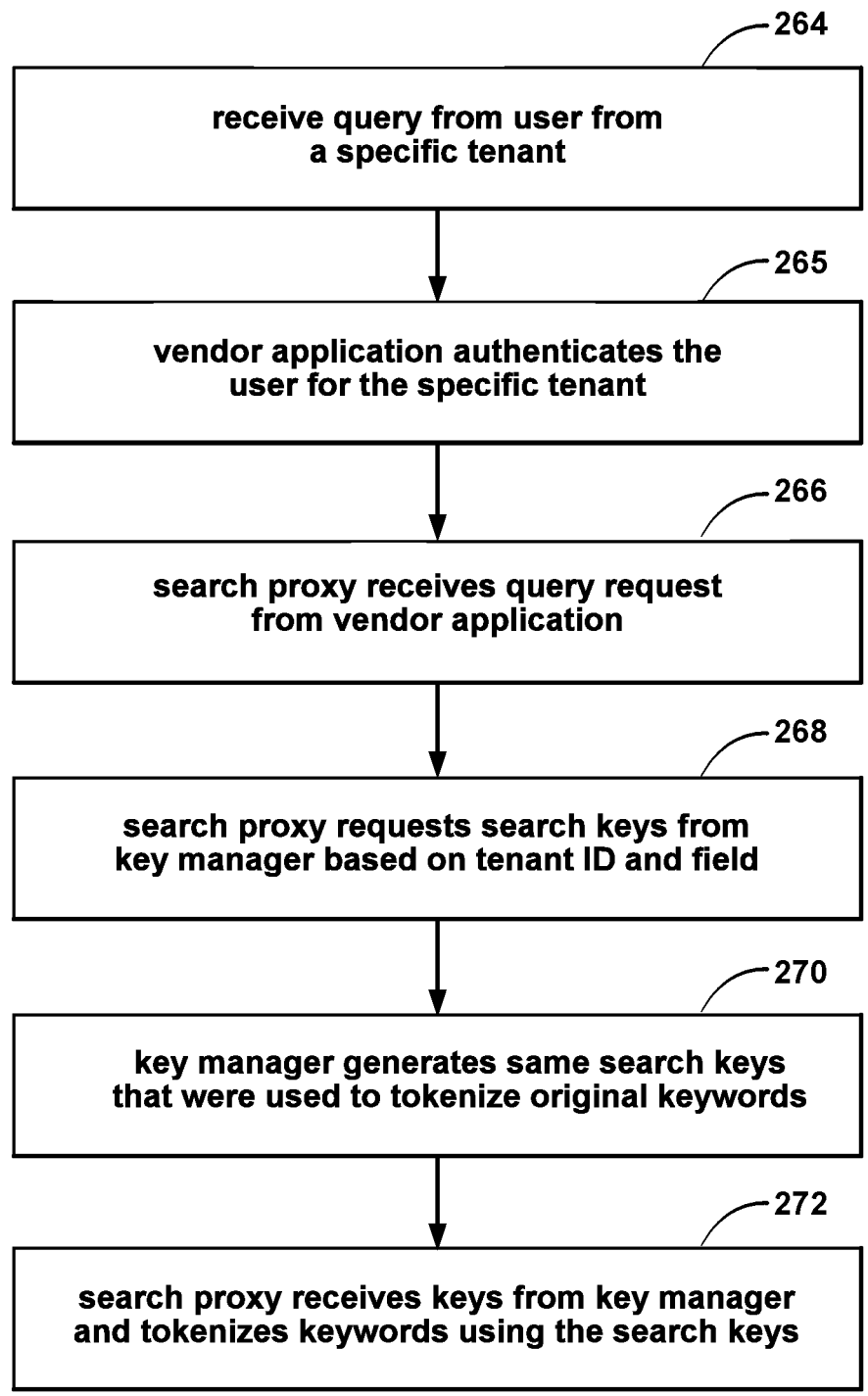
FIG. 25 illustrates a companion flow chart for FIG. 24, showing typical steps for the key management of the search query.

FIG. 24 illustrates key management typical for a search query, in this case, the search query of FIG. 22. FIG. 25 illustrates a companion flow chart for FIG. 24, showing typical steps for the key management of the search query. Referring to FIGS. 24 and 25, where steps refer to FIG. 25, in step 264, the customer query is received by the vendor application, for example vendor application 107 of FIG. 19. In step 265, the vendor application authenticates the user and tenant. In step 266, the search proxy 104 receives the authenticated query 267. In step 268, the search proxy, on behalf of the cryptographic tokenization routine 173, makes a request 269 for tenant-specific search keys from the key management system 114. In the example given in FIG. 21, corresponding separate search keys were requested to cryptographically tokenize each corresponding protected field. Following the same example, in FIGS. 24 and 25, in step 268, corresponding separate search keys are requested for each corresponding protected field used in the search query, which in this case are the title and author fields. In step 270, the key management system 114 unwraps the wrapped search keys generated in step 250 of FIG. 22, to retrieve the field-specific search keys. The search keys generated in step 250 are typically held in memory. The key management system 114 uses the tenant key management system 243, or alternatively, the vendor key management system, to unwrap the field-specific search keys and pass them back to the key management system 114. In step 272, the cryptographic tokenization routine 173 generates cryptographically-tokenized keywords using the same tenant-specific and field-specific search keys used to index document records on behalf of the tenant. The title field search key 273 and author field search key 274 are returned to search proxy 104, where the tokenization routine cryptographically tokenizes the keywords from the search query to produce cryptographically-tokenized keywords, as previously describe. Any plaintext keywords that match the plaintext words in the same document field of the customer record 194 of FIG. 13, would result in the cryptographically-tokenized keywords matching the cryptographically-tokenized words in the secured-in-use document record 195.

Figure 26:
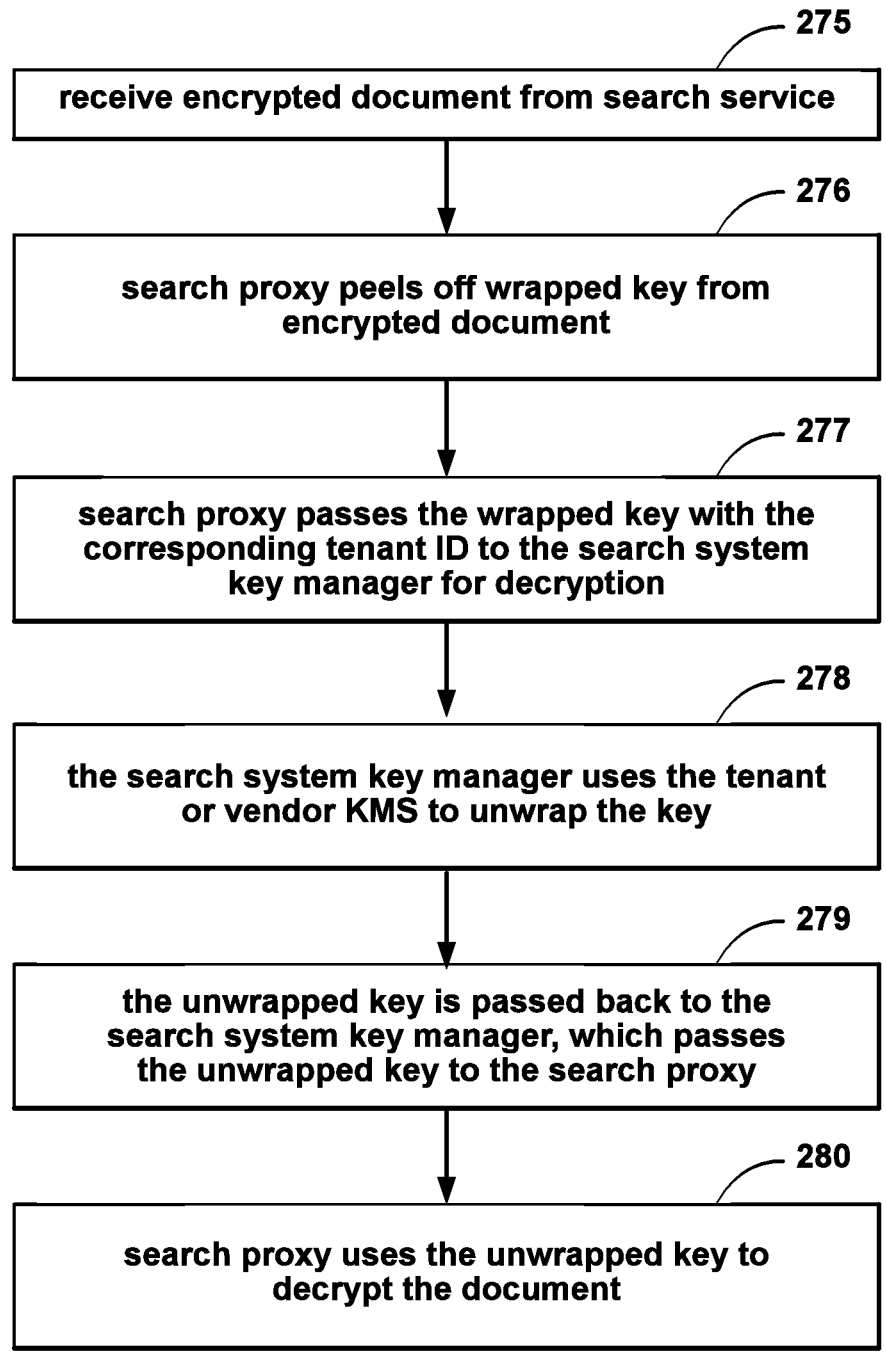
FIG. 26 illustrates a flow chart showing the decryption process from the search proxy.

FIG. 26 illustrates a flow chart showing the decryption process from the search proxy 104 of FIG. 19. Referring to FIGS. 19 and 26, where steps refer to FIG. 26, in step 275, the search proxy 104 retrieves the search results, which include the encrypted document. In step 276, the search proxy extracts the wrapped key from the encrypted document. In step 277, the search proxy passes the wrapped key with the corresponding tenant ID to the key management system 114. In step 278, the key management system 114 uses the tenant key management system 243, or alternatively, the vendor key management system, to unwrap the encryption key. In step 279, the unwrapped key is passed back to the key management system 114. The key management system 114 passes the unwrapped encryption key to the search proxy 104. In step 280, the search proxy 104 uses the unwrapped encryption key to decrypt the encrypted document and merges the decrypted fields back into the decrypted document record, as previously discussed.

Figure 27:
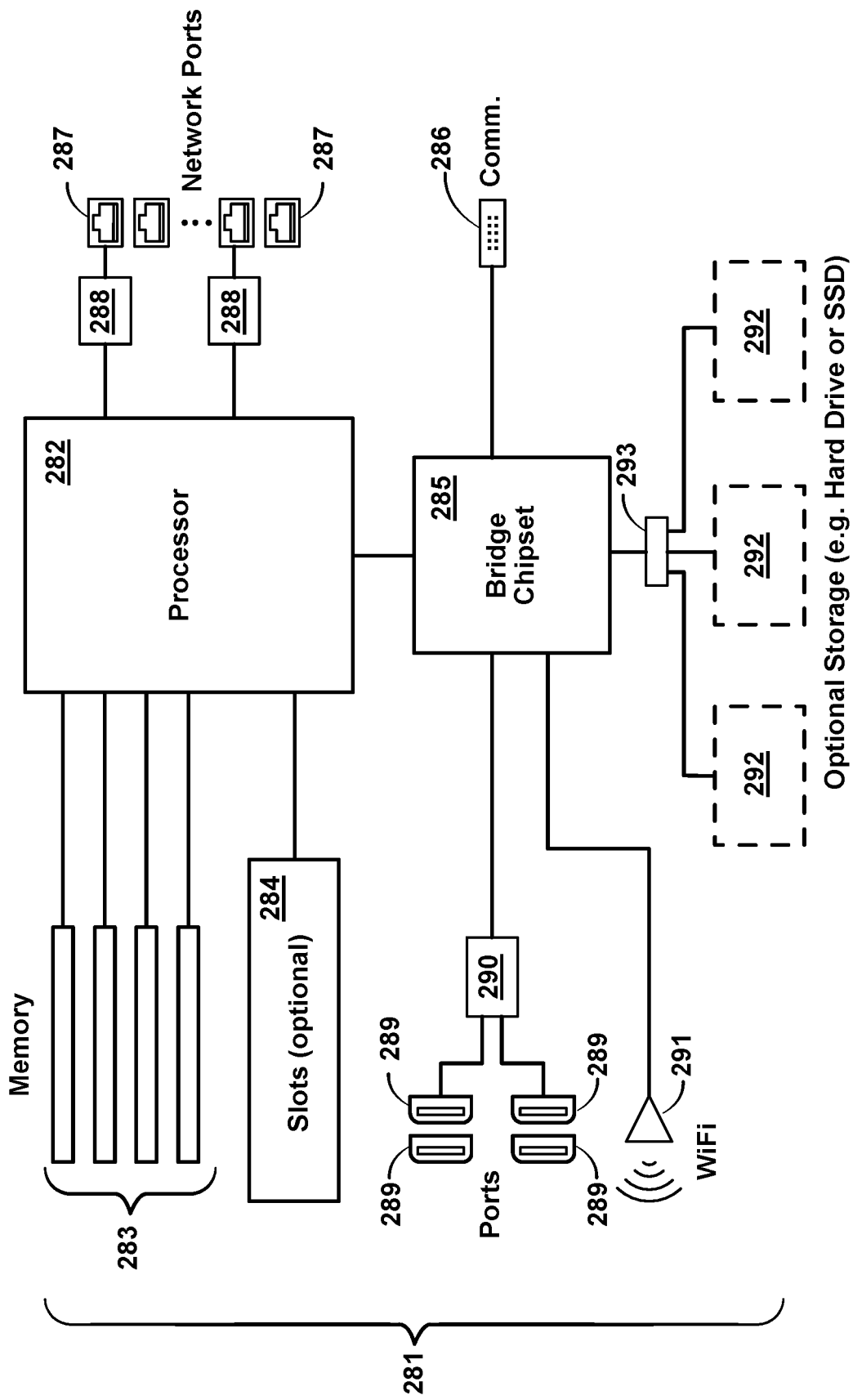
FIG. 27 illustrates an example of a host computer or server suitable for hosting the search proxy, vendor application, or the ready-made search software.

The search management system discussed throughout this disclosure can be implemented on a variety of hardware devices with the search proxy and the key management system residing on either the same hardware device or separate hardware devices. Likewise, the ready-made search software and vendor applications can also reside on a variety of hardware devices. FIG. 27 illustrates an example of a host computer 281 or server suitable for hosting the search proxy, vendor application, or the ready-made search software. As illustrated in FIGS. 3-5, these applications or services can be hosted in the same or different physical locations. When they are hosted at the same location, some of the applications and services might be each hosted individually on dedicated machines or on shared machines. For example, the vendor application may be hosted on a server that is fronted by a web server. The search proxy may be hosted on a dedicated computer or virtualized application server on a shared computer. The ready-made search software might be hosted on a host computer that hosts a dedicated or virtualized application. The files could be stored on a file server or stored on a network appliance server. Alternatively, some of the infrastructure discussed in this disclosure might be hosted across distributed devices. For example, file storage might be distributed across multiple network appliance servers or may be mirrored across multiple locations.

Referring to FIG. 27, the host computer 281 can include a processor 282, memory 283, card slots 284, a bridge chipset 285, a communication port 286, network ports 287, network interface 288, general-purpose ports 289, general-purpose port interface 290, wireless controller 291, storage device 292, and storage interface 293. The processor 282 can be a microprocessor, such as central processing units (CPUs) sold under trademarks XEON by Intel Corporation, AMD RYZEN, by Advance Microsystems, Inc., AMD EPYC by Advance Microsystems, Inc., or AWS GRAVITON by Amazon, Inc or sold under the trade name M1 ULTRA by Apple, Inc. The processor could be one or more CPUs, an infrastructure processing unit (IPU), or one or more CPUs in combination with one or more IPUs. The IPU could be a dedicated processor or a field programmable gate array. The memory 283 is typically dynamic random-access memory. It could be socketed or soldered onto the motherboard of the host computer 281 or it could be unified within the CPU packaging; for example, Apple's system on a chip (SoC) M1 series processor. Alternatively, a portion or all of the memory may be included within the processor itself.

The memory 283 can store instructions that when executed cause the processor to execute various steps or processes described within this disclosure. The search proxy could include instructions that execute on a processor within a dedicated device or a shared device. The instructions for carrying out various processes on behalf of the search proxy could be stored remotely from the device executing the instructions. For example, the search proxy may run instructions on a dedicated device and those instructions may be stored in memory on that dedicated device. However, those instructions may also be stored on a hard drive or SSD on a separate device, for example, an application server. When the dedicated device that executes instructions on behalf of the search proxy crashes or needs to be upgraded, the instructions could be uploaded from the application server.

The bridge chipset 285 is optional, and its presence depends on the architecture of the processor 282. The bridge chipset 285 may include a core logic integrated circuit in direct communication with the processor 282, often referred to as a "northbridge," and a secondary core logic integrated circuit that is in communication with the northbridge, known as "southbridge." As illustrated, the bridge chipset 285 can control memory, graphics, and communications. The northbridge handles faster tasks while the southbridge handles slower tasks. The functionality of the bridge chipset 285 may be integrated within the processor 282. For example, the processor might have an integrated graphics controller or memory control hub.

The host computer 281 may optionally have card slots 284, for example, these may be PCIe slots for accepting PCIe cards. Examples of PCIe card include Ethernet interface cards, RAID controllers, or SSD PCIe cards. The general-purpose ports 289 can include USB ports with form factors USB 2, USB 3, or USB 4 with form factors that can include type A, type B, type C, micro-A, micro-B, mini-A, or mini-B. The ports may include a Thunderbolt port, for example, Thunderbolt 1, Thunderbolt 2, Thunderbolt 3, or Thunderbolt 4.

The wireless ports can follow 802.11 standard or other wireless standards suitable for host computing devices. The network ports 287 are typically Ethernet ports, for example 10-BASE-T, 100-BASE-T, or 1000-BASE-T. The connections may be over a twisted pair or fiber optics. The host computer 281 may optionally include a storage device 292 or multiple storage devices. The storage device 292 is typically an SSD or hard drive. Storage may be within the host computer 281 or may be external, for example, on a network appliance server. In some instances, it may be desirable that the server be without a storage device 292. For instance, for security reasons, the search proxy could reside on a host computer 281 without a storage device 292. In that instance, the search proxy would run in memory 283 and loaded from a separate application server residing on a different device. Data would be cached and could be flushed from memory on predetermined intervals.

Examples of computers that may be suitable include computers sold under the trademarks PROLIANT by Hewlett Packard, POWEREDGE by Dell, Inc., AWS server by Amazon, THINKSYSTEM data center servers by Lenovo Pte., Ltd., or sold under trade names IBM ISERIES servers by International Business Machines, Inc., or INSPUR NF series servers by Inspur Group Ltd. The implementation of the vendor application, ready-made search software, key management systems, data storage, or any of the other systems or infrastructure discussed in this disclosure is not limited to these host computers. One of the advantages of the search management system described throughout this disclosure is that it can be dropped into an existing infrastructure. Those skilled in the art will readily recognize which models or brands of computing devices are suitable for their particular application.

A search management system and method has been described. It is not the intent of this disclosure to limit the claims to the examples or variations of the system and methods described in the specification. Those skilled in the art will recognize that variations will occur when embodying the claims in specific implementations and environments. For example, the disclosure gave simplified examples of how the search management system, through the search proxy and key management system, can protect data while in-use within a ready-made search software. These examples used a customer record in FIGS. 10-12, or a message record in FIGS. 13-15, 21, and 24. The concept discussed is not limited to these simple examples but extends to a variety of documents and document records. These include personnel records, contact management records, project management records and other documents formatted as structured text.

FIGS. 10, 11, 13-16, 21, and 24 show some of the elements represented in JSON or in pseudo-JSON notation. JSON is representative of what might be received by ready-made search software, for example Elasticsearch. JSON is used because it is easy to understand, and it is hoped that a person of ordinary skill could quickly grasp the concepts discussed in the examples. However, the concepts, methods, and topologies described are not limited to JSON notation. Those skilled in the art would readily recognize how the concepts can be easily applied to other data interchange formats.

In FIGS. 1-4, the search proxy 104 is described as being positioned between the vendor application 107 and the ready-made search software 103. Similarly, in FIGS. 5 and 6, the search proxy 132 is described as being positioned between vendor application 130 and the ready-made search software 143. The search proxy 137 is described as being positioned between vendor application 135 and ready-made search software 143. While these figures illustrated the search proxy being directly between the vendor application and the ready-made search software, it is well within the scope of the search management system that there may be intermediaries. For example, in FIGS. 5 and 6, while not shown, there may be intermediary HTTPS servers to secure in transit the communication between the search proxy 137 and the ready-made search software 143.

The term "encrypted document field" is typically used in this disclosure to describe protected fields from a plaintext document record that are aggregated together, encrypted using reversible symmetric encryption and then appended to the modified document record that includes one or more cryptographically-tokenized fields and optionally, unprotected plaintext fields. While described as a "field," it can also be a stand-alone encrypted document record. Therefore, the terms encrypted document field, encrypted document record, or encrypted document have been used interchangeably.

It is possible to implement some of the features described in separate examples in combination within a single example. Similarly, it is possible to implement some of the features described in a single example either separately or in combination in multiple examples. The inventor envisions that these variations fall within the scope of the claims. For example, the cryptographic tokenization, encryption, and decryption by the search proxy is independent of where the search proxy resides as shown in FIGS. 3 and 4, as shown in FIGS. 5 and 6 or some other configuration. Therefore, the explanations for FIGS. 10-18 apply equally to the configuration of FIGS. 3 and 4 as well as the configuration in FIGS. 5 and 6.

While the examples and variations are helpful to those skilled in the art in understanding the claims, the scope of the claims is defined solely by the claims themselves and their equivalents.

The word "or" as used within this disclosure, means an "inclusive or" except as specifically indicated or if prefixed by words or phrases, such as "either" that signal mutual exclusivity. Rather than a choice between two elements, this disclosure takes the meaning of "or" not to mean just an exclusive choice between two elements but can also mean the combination of elements, unless specifically indicated otherwise. For example, if someone were to say "I will wear a waterproof jacket if it rains or snows," that would mean: "I will wear a waterproof jacket if it rains, I will wear a waterproof jacket if it snows, I will wear a waterproof jacket if it rains and it snows at the same time." On the other hand, if someone were to say, "at the fork in the road, I will take either the right-hand path or the left-hand path" the meaning would be that the person would choose between the two alternative paths.

Throughout this disclosure, the transitional phrases, "including," "comprising," "containing," and "character-ized" are inclusive and open ended and do not exclude additional unrecited elements or steps. The claims may use the modifier "one or more" to add clarity to a recited element. The use of "one or more" in this disclosure or the claims does not preclude the articles "a," or "an" to also mean one or more.

What is claimed is:

1. A method for securely using a ready-made search software by a cloud service provider, comprising:
receiving a document from a vendor application into a search proxy, the search proxy being positioned between the vendor application and the ready-made search software;
irreversibly cryptographically tokenizing one or more plaintext words from within a protected field of the document by the search proxy using a search key and replacing the protected field in the document with a cryptographically-tokenized field, creating a modified document record;
sending the modified document record to the ready-made search software;
indexing the modified document record, including the cryptographically-tokenized field, by the ready-made search software and storing the modified document record by the ready-made search software;
the search key is two or more search keys;
the protected field is a two or more protected fields; and
irreversibly cryptographically tokenizing the one or more plaintext words from within each protected field of the two or more protected fields of the document from within the search proxy using a corresponding separate search key of the two or more search keys for each protected field of the two or more protected fields.

2. The method of claim 1, wherein:
indexing the cryptographically-tokenized field is accomplished without modification of the ready-made search software.

3. The method of claim 1, further comprising:
receiving a search query comprising a keyword in the protected field from the vendor application;
irreversibly cryptographically tokenizing the keyword using the search key and replacing the keyword with a cryptographically-tokenized keyword, creating a cryptographically-tokenized search query;
sending the cryptographically-tokenized search query to the ready-made search software;
producing search results within the ready-made search software by matching cryptographically-tokenized keywords within a search index of the ready-made search software;
returning the search results to the search proxy;
removing the cryptographically-tokenized field from each modified document record in the search results thereby creating an updated document record; and
returning the updated document record to the vendor application.

4. The method of claim 1, wherein:
each plaintext word within the protected field is split into a two or more overlapping n-grams;
irreversibly cryptographically tokenizing each n-gram of the two or more overlapping n-grams using the search key, forming cryptographically-tokenized n-grams; and
combining the cryptographically-tokenized n-grams to form the cryptographically-tokenized field.

5. The method of claim 1, wherein:
splitting the one or more plaintext words from a search query into a two or more overlapping n-grams;
irreversibly cryptographically tokenizing the two or more overlapping n-grams using the search key, producing cryptographic tokens, and joining the cryptographic tokens with conjunctions, creating a cryptographically-tokenized search query;
sending the cryptographically-tokenized search query to the ready-made search software;
producing search results within the ready-made search software by matching cryptographically-tokenized keywords within a search index of the ready-made search software; and
returning the search results to the search proxy.

6. The method of claim 1, further comprising:
before sending the modified document record to the ready-made search software:
(a) encrypting the protected field from within the search proxy using an encryption key, thereby creating an encrypted document field; and
(b) appending the encrypted document field to the modified document record.

7. The method of claim 6, wherein:
indexing the cryptographically-tokenized field is accomplished without modification of the ready-made search software.

8. The method of claim 6, further comprising:
receiving a search query comprising a keyword in the protected field from the vendor application;
irreversibly cryptographically tokenizing the keyword using the search key and replacing the keyword with a cryptographically-tokenized keyword, creating a cryptographically-tokenized search query;
sending the cryptographically-tokenized search query to the ready-made search software;
producing search results within the ready-made search software by matching cryptographically-tokenized keywords within a search index of the ready-made search software;
returning the modified document record containing the cryptographically-tokenized field and the encrypted document field to the search proxy;
decrypting the encrypted document field in the modified document record using the encryption key to produce a decrypted field;
removing the encrypted document field from the modified document record;
replacing the cryptographically-tokenized field with the decrypted field to produce a decrypted document record; and
returning the decrypted document record to the vendor application.

9. The method of claim 6, wherein:
each plaintext word within the protected field is split into a two or more overlapping n-grams;
irreversibly cryptographically tokenizing each n-gram of the two or more overlapping n-grams using the search key, forming cryptographically-tokenized n-grams; and
combining the cryptographically-tokenized n-grams to form the cryptographically-tokenized field.

10. The method of claim 6, wherein:
splitting the one or more plaintext words from a search query into a two or more overlapping n-grams;
irreversibly cryptographically tokenizing the two or more overlapping n-grams using the search key, producing cryptographic tokens;
joining the cryptographic tokens with conjunctions, creating a cryptographically-tokenized search query;
sending the cryptographically-tokenized search query to the ready-made search software;
producing search results within the ready-made search software by matching cryptographically-tokenized keywords within a search index of the ready-made search software;
returning the modified document record containing the cryptographically-tokenized field and the encrypted document field to the search proxy;
decrypting the encrypted document field from the modified document record using the encryption key to produce a decrypted field;
removing the encrypted document field from the modified document record;
replacing the cryptographically-tokenized field with the decrypted field to produce a decrypted document record; and
returning the decrypted document record to the vendor application.

11. A method for securely using a ready-made search software for use with a cloud service provider in a multi-tenant environment, comprising:
receiving a document from a vendor application on behalf of a tenant of two or more tenants into a search proxy, the search proxy being positioned between the vendor application and the ready-made search software and the document including a tenant ID;
irreversibly cryptographically tokenizing one or more plaintext words from within a protected field of the document by the search proxy using a tenant-specific search key and replacing the protected field in the document with a cryptographically-tokenized field, creating a modified document record that includes the tenant ID;
sending the modified document record to the ready-made search software;
indexing the modified document record, including the cryptographically-tokenized field, by the ready-made search software and storing the modified document record by the ready-made search software;
the protected field is two or more protected fields; and
irreversibly cryptographically tokenizing the one or more plaintext words from within the protected field of the document uses a separate tenant-specific search key for each protected field of the two or more protected fields.

12. The method of claim 11, wherein:
indexing the cryptographically-tokenized field by the ready-made search software is accomplished without modification of the ready-made search software.

13. The method of claim 11, further comprising:
receiving a search query that comprises a keyword in a second protected field from the vendor application on behalf of the tenant, the search query includes the tenant ID;
irreversibly cryptographically tokenizing the search query using the tenant-specific search key creating a cryptographically-tokenized search query;
sending the cryptographically-tokenized search query to the ready-made search software and producing a search result within the ready-made search software by matching cryptographically-tokenized keywords within a search index of the ready-made search software;
returning the search result to the search proxy;
removing the cryptographically-tokenized field from each modified document record in the search result thereby creating an updated document record; and
returning the updated document record to the vendor application.

14. The method of claim 11, wherein:
each plaintext word in the protected field is split into a two or more overlapping n-grams;
irreversibly cryptographically tokenizing each of the two or more overlapping n-grams using the tenant-specific search key, forming cryptographically-tokenized n-grams; and
combining the cryptographically-tokenized n-grams to form the cryptographically-tokenized field.

15. The method of claim 11, further comprising:
splitting the one or more plaintext words from a search query into a two or more overlapping n-grams;
irreversibly cryptographically tokenizing the two or more overlapping n-grams using the tenant-specific search key, producing tokens and joining the tokens with conjunctions, creating a cryptographically-tokenized search query; and
sending the cryptographically-tokenized search query to the ready-made search software.

16. The method of claim 11, further comprising:
before sending the modified document record to the ready-made search software:
(a) encrypting the protected field from within the search proxy using a tenant-specific encryption key, thereby creating an encrypted document field; and
(b) appending the encrypted document field to the modified document record.

17. The method of claim 16, wherein:
indexing the cryptographically-tokenized field by the ready-made search software is accomplished without modification of the ready-made search software.

18. The method of claim 16, further comprising:
receiving a search query that comprises a keyword in a second protected field from the vendor application on behalf of the tenant, the search query includes the tenant ID;
irreversibly cryptographically tokenizing the search query using the tenant-specific search key creating a cryptographically-tokenized search query;
sending the cryptographically-tokenized search query to the ready-made search software, producing search results within the ready-made search software by matching cryptographically-tokenized keywords within a search index of the ready-made search software;
returning the search results and the modified document record containing the cryptographically-tokenized field and the encrypted document field to the search proxy;
decrypting the encrypted document field in the modified document record using the tenant-specific encryption key to produce a decrypted field;
removing the encrypted document field from the modified document record;
replacing the cryptographically-tokenized field with the decrypted field to produce a decrypted document record; and
returning the decrypted document record to the tenant.

19. The method of claim 16, wherein:
each plaintext word in the protected field is split into a two or more overlapping n-grams;
irreversibly cryptographically tokenizing each of the two or more overlapping n-grams using the tenant-specific search key, forming cryptographically-tokenized n-grams; and
combining the cryptographically-tokenized n-grams to form the cryptographically-tokenized field.

20. The method of claim 16, further comprising:
splitting the one or more plaintext words from a search query into a two or more overlapping n-grams;
irreversibly cryptographically tokenizing the two or more overlapping n-grams using the tenant-specific search key, producing tokens and joining the tokens with conjunctions, creating a cryptographically-tokenized search query;
sending the cryptographically-tokenized search query to the ready-made search software;
producing search results within the ready-made search software by matching cryptographically-tokenized keywords within a search index of the ready-made search software;
returning the modified document record containing the cryptographically-tokenized field to the search proxy;
decrypting the encrypted document field from the modified document record using the tenant-specific encryption key to produce a decrypted field;
replacing the cryptographically-tokenized field with the decrypted field to produce a decrypted document record; and
returning the decrypted document record to the vendor application.

21. A search management system for using a ready-made search software for use with a cloud service provider, comprising:
a processor;
a memory storing instructions that when executed cause the processor to:
receive a document from a vendor application on behalf of a tenant of two or more tenants into a search proxy, the search proxy being positioned between the vendor application and the ready-made search software and the document including a tenant ID;
irreversibly cryptographically tokenize one or more plaintext words from within a protected field of the document by the search proxy using a tenant-specific search key and replacing the protected field in the document with a cryptographically-tokenized field, creating a modified document record that includes the tenant ID;
send the modified document record to the ready-made search software;
index the modified document record, including the cryptographically-tokenized field, by the ready-made search software and storing the modified document record by the ready-made search software;
the protected field is two or more protected fields; and
the memory storing the instructions that when executed cause the processor to irreversibly cryptographically tokenize plaintext words from within the protected field of the document from within the search proxy uses a separate tenant-specific search key for each protected field of the two or more protected fields.

22. The search management system of claim 21, wherein:
index the cryptographically-tokenized field by the ready-made search software is accomplished without modification of the ready-made search software.

23. The search management system of claim 21, wherein:
the search proxy receives a search query from the vendor application on behalf of the tenant, the search query including a keyword in the protected field and the tenant ID;
the search proxy irreversibly cryptographically tokenizes the keyword using the tenant-specific search key and replaces the keyword with a cryptographically-tokenized keyword, creating a cryptographically-tokenized search query, and sends the cryptographically-tokenized search query to the ready-made search software;
the ready-made search software produces search results by matching cryptographically-tokenized keywords within a search index of the ready-made search software and returns the search results to the search proxy;
the search proxy removes the cryptographically-tokenized field from each modified document record in the search results, thereby creating an updated document record; and
the search proxy returns the updated document record to the vendor application.

24. The search management system of claim 21, wherein:
each plaintext word in the protected field is split into two or more overlapping n-grams; and
the search proxy irreversibly cryptographically tokenizes each of the two or more overlapping n-grams using the tenant-specific search key, forming cryptographically-tokenized n-grams, and combines the cryptographically-tokenized n-grams to form the cryptographically-tokenized field.

25. The search management system of claim 21; wherein:
the search proxy splits the one or more plaintext words from a search query into a two or more overlapping n-grams, produces cryptographic tokens by irreversibly cryptographically tokenizing the two or more overlapping n-grams using the tenant-specific search key, joins the cryptographic tokens with conjunctions to produce a cryptographically-tokenized search query, and sends the cryptographically-tokenized search query to the ready-made search software;
the ready-made search software produces search results by matching cryptographically-tokenized keywords within a search index of the ready-made search software and returns the search results to the search proxy;
the search proxy removes the cryptographically-tokenized field from each modified document record in the search results, thereby creating an updated document record; and
the search proxy returns the updated document record to the vendor application.

26. The search management system of claim 21, further comprising:
before sending the modified document record to the ready-made search software, the processor:
(a) encrypts the protected field from within the search proxy using a tenant-specific encryption key, thereby creating an encrypted document field; and
(b) appends the encrypted document field to the modified document record.

27. The search management system of claim 26, wherein:
index the cryptographically-tokenized field by the ready-made search software is accomplished without modification of the ready-made search software.

28. The search management system of claim 26, wherein:
the search proxy receives a search query from the tenant, the search query including the tenant ID;
the search proxy irreversibly cryptographically tokenizes the search query using the tenant-specific search key creating a cryptographically-tokenized search query, sends the cryptographically-tokenized search query to the ready-made search software;
the ready-made search software produces search results by matching cryptographically-tokenized keywords within a search index of the ready-made search software and returns the search results to the search proxy; and
the search proxy processes each document in the search results, decrypting the encrypted document field and replacing each cryptographically-tokenized protected field with the one or more plaintext words, and returns the search results to the tenant.

29. The search management system of claim 26, wherein:
each plaintext word in the protected field is split into two or more overlapping n-grams; and
the search proxy irreversibly cryptographically tokenizing each of the two or more overlapping n-grams using the tenant-specific search key, forming cryptographically-tokenized n-grams, and combines the cryptographically-tokenized n-grams to form the cryptographically-tokenized field.

30. The search management system of claim 26, wherein:
the search proxy splits the one or more plaintext words from a search query into a two or more overlapping n-grams, produces cryptographic tokens by irreversibly cryptographically tokenizing the two or more overlapping n-grams using the tenant-specific search key, joins the cryptographic tokens with conjunctions to produce a cryptographically-tokenized search query, and sends the cryptographically-tokenized search query to the ready-made search software;
the ready-made search software produces search results by matching cryptographically-tokenized keywords within a search index of the ready-made search software, where each result is the modified document record containing the cryptographically-tokenized field, and returns the search results to the search proxy; and
the search proxy decrypts the encrypted document field from the modified document record using the tenant-specific encryption key to produce a decrypted field, replaces the cryptographically-tokenized field with the decrypted field to produce a decrypted document record, and returns the decrypted document record to the vendor application.

* * * * *